(12) United States Patent
Japikse

(10) Patent No.: US 11,085,460 B2
(45) Date of Patent: Aug. 10, 2021

(54) FLOW CONTROL STRUCTURES FOR TURBOMACHINES AND METHODS OF DESIGNING THE SAME

(71) Applicant: Concepts NREC, LLC, White River Junction, VT (US)

(72) Inventor: David Japikse, Woolwich, ME (US)

(73) Assignee: Concepts NREC, LLC, White River Junction, VT (US)

(*) Notice: Subject to any disclaimer, the term of this patent is extended or adjusted under 35 U.S.C. 154(b) by 513 days.

(21) Appl. No.: 15/978,929

(22) Filed: May 14, 2018

(65) Prior Publication Data
US 2018/0258950 A1 Sep. 13, 2018

Related U.S. Application Data

(60) Continuation of application No. 15/280,362, filed on Sep. 29, 2016, now Pat. No. 9,970,456, which is a
(Continued)

(51) Int. Cl.
*F04D 29/44* (2006.01)
*F01D 9/06* (2006.01)
(Continued)

(52) U.S. Cl.
CPC .......... *F04D 29/444* (2013.01); *F01D 5/12* (2013.01); *F01D 9/02* (2013.01); *F01D 9/06* (2013.01);
(Continued)

(58) Field of Classification Search
CPC .... F04D 29/444; F04D 29/162; F04D 29/167; F04D 29/284; F04D 29/4206;
(Continued)

(56) References Cited

U.S. PATENT DOCUMENTS 4,086,022 A 4/1978 Freeman et al.
7,658,592 B1 2/2010 Jarrah et al.
(Continued)

FOREIGN PATENT DOCUMENTS

GB 2034435 A 6/1980
JP 05149296 A * 6/1993
(Continued)

OTHER PUBLICATIONS

Hildebrandt, A. et al., "Numerical Investigation of the Effect of Different Back Sweep Angle and Exducer Width on the Impeller Outlet Flow Pattern of a Centrifugal Compressor with Vaneless Diffuser", Apr. 2007, Journal of Turbomachinery, vol. 129, ASME. (Year: 2007).*
(Continued)

*Primary Examiner* — Cedric Johnson
(74) *Attorney, Agent, or Firm* — Downs Rachlin Martin PLLC

(57) ABSTRACT

Flow control devices and structures designed and configured to improve the performance of a turbomachine. Exemplary flow control devices may include various flow guiding channels, ribs, diffuser passage-width reductions, and other treatments and may be located on one or both of a shroud and hub side of a machine to redirect, guide, or otherwise influence portions of a turbomachine flow field to thereby improve the performance of the machine.

30 Claims, 25 Drawing Sheets

Related U.S. Application Data division of application No. 14/749,467, filed on Jun. 24, 2015, now Pat. No. 9,845,810.

(60) Provisional application No. 62/016,431, filed on Jun. 24, 2014, provisional application No. 62/069,462, filed on Oct. 28, 2014, provisional application No. 62/103,231, filed on Jan. 14, 2015, provisional application No. 62/103,233, filed on Jan. 14, 2015.

(51) Int. Cl.

| | | |
|---|---|---|
| *F01D 5/12* | (2006.01) | |
| *F01D 9/02* | (2006.01) | |
| *F01D 25/24* | (2006.01) | |
| *G06F 17/10* | (2006.01) | |
| *F04D 29/16* | (2006.01) | |
| *F04D 31/00* | (2006.01) | |
| *F04D 29/66* | (2006.01) | |
| *F04D 29/42* | (2006.01) | |
| *F04D 29/52* | (2006.01) | |
| *F04D 29/68* | (2006.01) | |
| *G06F 30/17* | (2020.01) | |
| *G06F 30/28* | (2020.01) | |
| *G06F 30/15* | (2020.01) | |
| *F04D 29/28* | (2006.01) | |
| *F01D 5/04* | (2006.01) | |
| *F01D 9/04* | (2006.01) | |
| *G06F 113/08* | (2020.01) | |

(52) U.S. Cl.
CPC ........... *F01D 25/24* (2013.01); *F04D 29/162* (2013.01); *F04D 29/167* (2013.01); *F04D 29/284* (2013.01); *F04D 29/426* (2013.01); *F04D 29/4206* (2013.01); *F04D 29/441* (2013.01); *F04D 29/448* (2013.01); *F04D 29/526* (2013.01); *F04D 29/664* (2013.01); *F04D 29/685* (2013.01); *F04D 31/00* (2013.01); *G06F 17/10* (2013.01); *G06F 30/15* (2020.01); *G06F 30/17* (2020.01); *G06F 30/28* (2020.01); *F01D 5/048* (2013.01); *F01D 9/045* (2013.01); *F01D 9/048* (2013.01); *F05D 2240/121* (2013.01); *F05D 2240/126* (2013.01); *F05D 2250/182* (2013.01); *F05D 2250/294* (2013.01); *F05D 2250/52* (2013.01); *G06F 2113/08* (2020.01)

(58) Field of Classification Search
CPC .... F04D 29/426; F04D 29/441; F04D 29/448; F04D 29/526; F04D 29/664; F04D 29/685; F04D 31/00; G06F 30/28; G06F 30/15; G06F 30/17; G06F 17/10; G06F 2113/08; F01D 5/12; F01D 9/02; F01D 9/06; F01D 25/24; F01D 5/048; F01D 9/045; F01D 9/048; F05D 2240/121; F05D 2240/126; F05D 2250/182; F05D 2250/294; F05D 2250/52
USPC .......................................................... 703/9, 6
See application file for complete search history.

(56) References Cited

U.S. PATENT DOCUMENTS

| | | |
|---|---|---|
| 8,016,557 B2 | 9/2011 | Abdelwahab |
| 2003/0152456 A1 | 8/2003 | Guemmer |
| 2009/0263233 A1 | 10/2009 | Guemmer |
| 2011/0097203 A1 | 4/2011 | Shibata |

FOREIGN PATENT DOCUMENTS

| | | |
|---|---|---|
| JP | H05149296 A | 6/1993 |
| JP | 2006170112 A | 6/2006 |
| JP | 2009068431 | 4/2009 |
| JP | 2010025000 | 2/2010 |

OTHER PUBLICATIONS

Bonaiuti, Duccio et al. "On the Coupling of Inverse Design and Optimization Techniques for the Multiobjective, Multipoint Design of Turbomachinery Blades", Apr. 2009, Journal of Turbomachinery, vol. 131, ASME. (Year: 2009).*

Veressm Arpad et al., "Inverse Design and Optimization of a Return Channel for a Multistage Centrifugal Compressor", Sep. 2004, Journal of Fluids Engineering, vol. 126, ASME. (Year: 2004).*

* cited by examiner

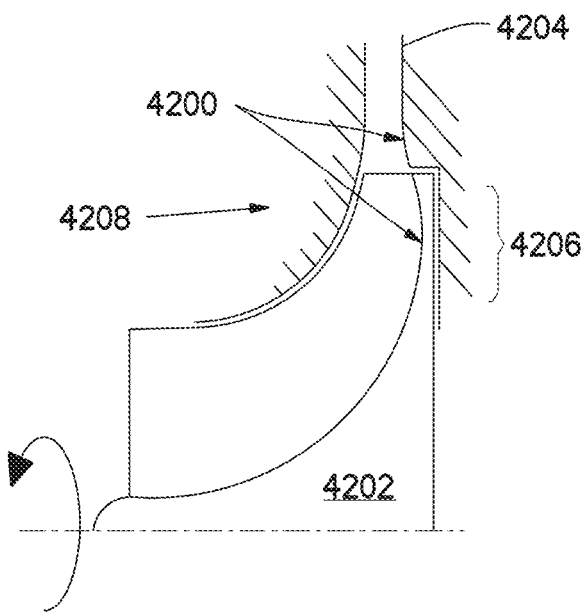
FIG. 42
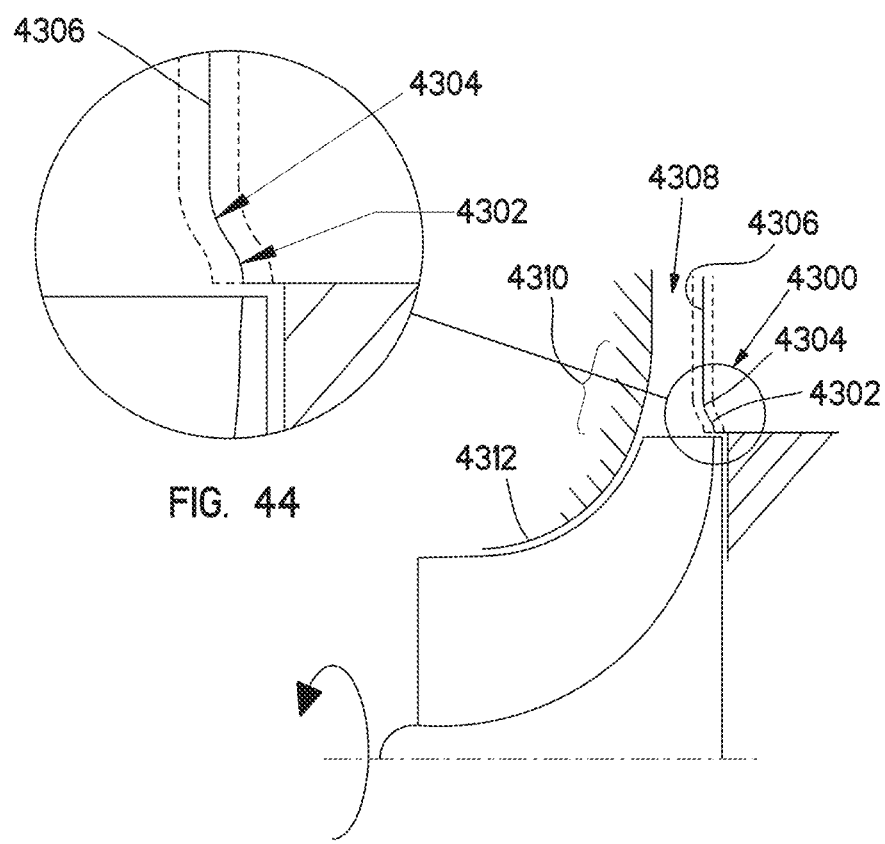
FIG. 44
FIG. 43

FLOW CONTROL STRUCTURES FOR TURBOMACHINES AND METHODS OF DESIGNING THE SAME

RELATED APPLICATION DATA

This application is a continuation of U.S. patent application Ser. No. 15/280,362, filed Sep. 29, 2016, entitled "Flow Control Structures For Turbomachines and Methods of Designing The Same," currently pending, which application is a divisional application of U.S. patent application Ser. No. 14/749,467, filed Jun. 24, 2015, entitled "Flow Control Structures For Turbomachines and Methods of Designing The Same," now U.S. Pat. No. 9,845,810. All of which applications claim the benefit of priority of:

U.S. Provisional Patent Application Ser. No. 62/016,431, filed Jun. 24, 2014, and titled "Structures and Methods for Forcing Coupling of Flow Fields of Adjacent Bladed Elements of Turbomachines, and Turbomachines Incorporating the Same";

U.S. Provisional Patent Application Ser. No. 62/069,462, filed Oct. 28, 2014, and titled "Turbomachines with Strong -Side Pinch and Curvature";

U.S. Provisional Patent Application Ser. No. 62/103,231, filed Jan. 14, 2015, and titled "Enhanced Vaneless Diffuser With Impeller Cover Slots and Ribs and Methods of Enhancing Impeller and Diffuser Stage Performance"; and U.S. Provisional Patent Application Ser. No. 62/103,233, filed Jan. 14, 2015, and titled "Turbo-PD Features and Methods of Incorporating Turbo-PD Features Into Turbomachinery";

each of which is incorporated by reference herein in its entirety.

FIELD OF THE INVENTION

The present invention generally relates to the field of turbomachinery. In particular, the present invention is directed to flow control structures for turbomachines and methods of designing the same.

BACKGROUND

Losses in turbomachinery stages vary in strength and character from case to case, but all turbomachinery stages include most of the following mechanisms for single phase, single component, flow: surface friction, secondary flow generation, exit mixing, clearance gap flows, leakage, and shock formation for highly compressible flows. These mechanisms are in turn influenced by many design parameters, such as flow rate, inlet pressure and temperature, exit pressure, incidence, and flow turning plus surface curvature, thickness, and conditions of rotation, amongst others. Losses negatively affect turbomachine performance and are generally understood to be a degradation of the flow state, leading to total pressure decay and an increase in entropy for the flow process. Losses can also lead to flow separation and stall and impeller slip, as well as non-uniform flow fields that frequently negatively impact performance of downstream elements. A need remains for improved devices and methods for reducing losses and mitigating the effects of losses.

SUMMARY OF THE DISCLOSURE

In one implementation, the present disclosure is directed to a radial turbomachine. The radial turbomachine includes an impeller including a hub and a plurality of blades and having an exit, each of the plurality of blades having a trailing edge proximate the exit and extending in a spanwise direction between the hub and a shroud side of the blade; and a diffuser having an inlet, a shroud side aligned with the shroud side of the blades, and a hub side aligned with the hub, the shroud side and the hub side of the diffuser defining a diffuser passageway having a width; wherein the impeller is designed and configured to generate a flow field at the diffuser inlet having a greater meridional velocity along one of the hub side and the shroud side of the diffuser than along the other one of the hub and shroud sides, the one of the hub and shroud sides of the diffuser having the greater meridional velocity being the strong side and the other one being the weak side; wherein the diffuser includes at least one strong-side pinch region providing a decrease in the diffuser passageway width that includes a convex surface on the strong side of the diffuser passageway, the convex surface providing a passage width reduction that is greater than any passage width reduction on the weak side of the diffuser.

In another implementation, the present disclosure is directed to a diffuser for use with an impeller, the impeller having a hub side and a shroud side and configured to generate a flow field having a greater meridional velocity along one of the hub side and the shroud side than the other one of the hub and shroud sides. The diffuser includes an inlet, a shroud side configured to be aligned with the shroud side of the impeller, and a hub side configured to be aligned with the hub side of the impeller, the shroud and the hub sides of the diffuser defining a diffuser passageway having a width, wherein the one of the shroud and hub sides of the diffuser configured to have a greater meridional velocity along its corresponding side is the strong side and the other one is the weak side; wherein the diffuser includes at least one strong-side pinch region that provides a decrease in the diffuser passageway width that includes a convex surface on the strong side of the diffuser passageway, the convex surface providing a passage width reduction that is greater than any passage width reduction on the weak side of the diffuser.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 42 is a cross-sectional side view of another exemplary diffuser having strong-side curvature;

FIG. 43 is a cross-sectional side view of an exemplary diffuser having dual strong-side curvature;

FIG. 44 is a close-up view of a portion of FIG. 43;

DETAILED DESCRIPTION

Aspects of the present disclosure include flow control devices and structures that are designed and configured to do one or more of: reduce the negative impact of losses on the performance of a turbomachine, improve the performance of a turbomachine, reduce the negative impact of losses on downstream elements that are generated in upstream elements, and improve the coupling and performance of upstream and downstream elements. As described more below, exemplary flow control devices made in accordance with the present disclosure may include various flow guiding channels, ribs, diffuser passage-width reductions, and other treatments, that may be located on one or both of a shroud and hub side of a machine to redirect, guide, or otherwise influence portions of a turbomachine flow field to thereby improve the performance of the machine.

Turbomachines, whether radial, axial, or mixed flow, and whether compressors, pumps, or turbines, etc., generally include an impeller that has a plurality of blades and that rotates about an axis of rotation and that is disposed within a fluid passage. The term "impeller," as used herein, refers to any type of bladed impeller or rotor of any type of turbomachine, including compressors, turbines, pumps, and fans. Turbomachine impellers have an inlet and an exit and are typically in fluid communication with a downstream element, such as a diffuser or cascade or nozzle or stator. Due to real-world effects, such as losses caused by surface friction, clearance gap flows, leakage, and vorticities caused by the fundamental nature of the rotating machine, non-uniformities develop in the impeller flow field. Such non-uniformities can be described in terms of non-uniformities in the magnitude and angle of fluid velocity in an impeller passage, with low-loss regions of the flow field being substantially aligned in a first direction, such as generally following an impeller passage direction, and other regions of the flow field being conveyed at various other angles and speeds up to and including normal to, and in the opposite direction of, the main impeller passage direction. Such off-angle flow field non-uniformities represent losses in the system and can cause further losses, such as flow instabilities, stall in a downstream element, backflow in the impeller, or large impeller exit aerodynamic blockage. As used herein and in the appended claims, the term "primary flow" and similar terms refer to the low-loss or zero-loss portion of an impeller flow field that is substantially aligned with the passage direction, and "secondary flow" and similar terms refer to other portions of the working fluid flow field and that may contain vorticity and appreciable losses.

Figure 1:
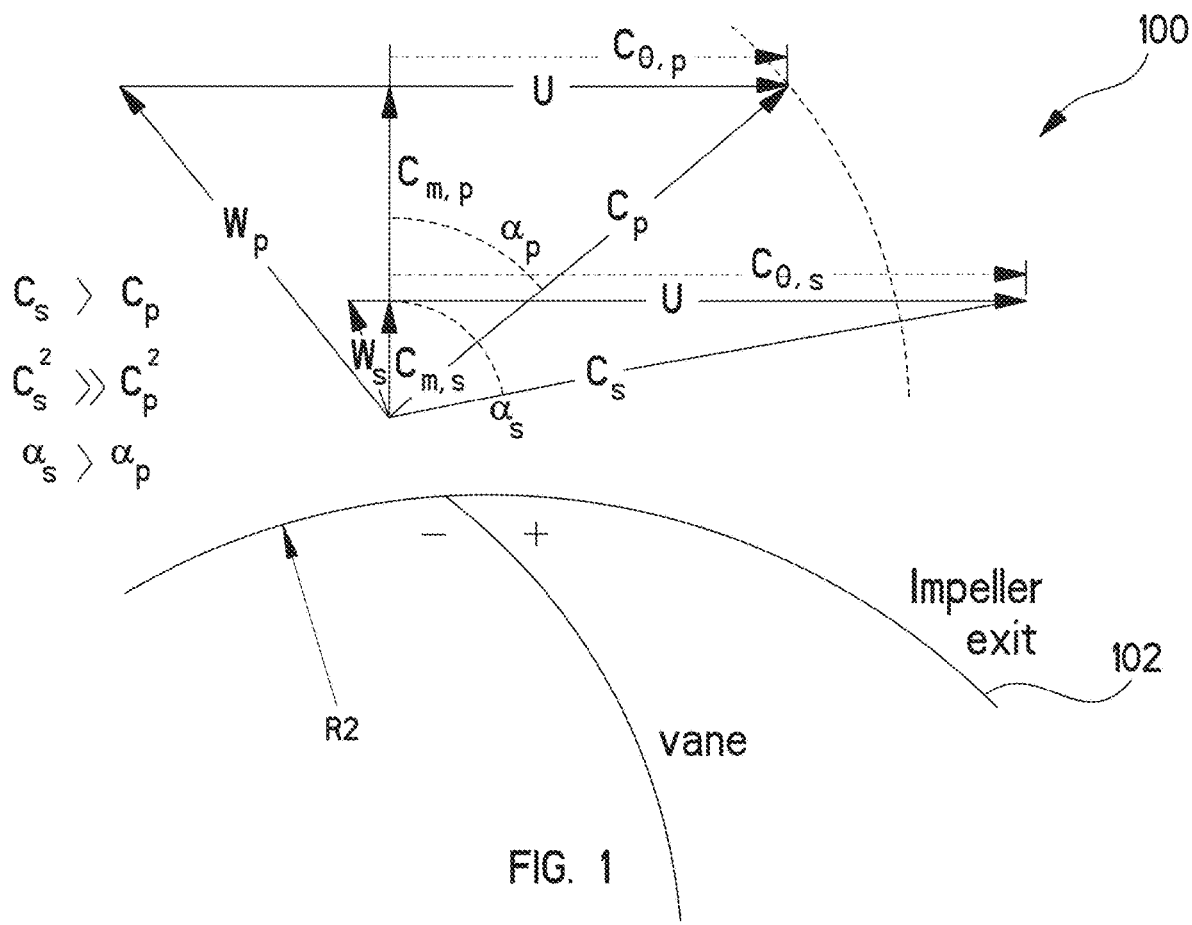
FIG. 1 is a diagram of velocity triangles for a flow distribution of an impeller flow field at impeller exit, resolved into primary and secondary flows and shown in absolute and relative frame of reference.

FIG. 1 is a simplified diagram of a working fluid velocity distribution 100 at impeller exit 102 resolved into two components—primary flow (p), and secondary flow (s)—and illustrated in the absolute and relative frame of reference. Specifically, velocities, C, are in the absolute or fixed frame of reference (for example, Earth) and velocities, W, are in the relative frame of motion (an observer rotating with the impeller). U is the impeller peripheral or tip wheel speed. FIG. 1 illustrates two sets of velocities: the larger triangle with subscripts "p" denotes the vector velocities for the primary flow field. The flatter triangle with subscripts "s" denote the vector velocities for the secondary flow. $C_{m,p}$ and $C_{m,s}$ are the meridional components of the primary and secondary velocities in the absolute frame, which are also the radial velocity for pure radial stages. $\alpha_p$ and $\alpha_s$ are the absolute flow angles measured in the absolute frame of reference, taken with respect to a meridional reference plane passing through the impeller centerline axis of rotation. FIG. 1 is a simplified representation of the primary and secondary components of the flow field, with the secondary flow velocity triangles representing with a single magnitude and angle (in either the absolute or relative frame) an averaged value of a very complex flow distribution with a large variety of angles and speeds.

While FIG. 1 is a simplified representation of typical flow variations at an impeller exit, it illustrates how the primary component of a flow field is well-energized in the relative frame, having greater relative velocity $W_P$ and meridional velocity $C_{m,p}$, while the secondary flow is not well energized in the rotating system, having significantly lower relative velocity $W_s$ and meridional velocity $C_{m,s}$. In addition, an impeller exit flow field typically has an array of differing flow angles, simplified as $\alpha_p$ and $\alpha_s$ in FIG. 1, which shows that the secondary flow has an average absolute angle, $\alpha_s$ that is typically large as compared to the primary flow. Such a distribution in flow angles results in mixing losses as the flow passes impeller exit 102, as the high-angle and low meridional momentum secondary flow stream tubes combine and mix with the primary flow tubes in the exit portion of an impeller.

In addition, such large-angle secondary flow, with corresponding low $C_{m,s}$, results in flow instability, stall, and flow reversal due to the low momentum in the meridional direction. The large secondary flow angles can also lead to stall at the leading edge of a subsequent vaned element, for example, a vaned diffuser, stator, or other cascade, or a long, shallow spiral flow path associated with high losses in a subsequent vaneless element, for example, a vaneless diffuser. Such secondary flow can cause poor coupling and poor interactions between an impeller and a downstream element, which can lead to decreased performance for both the impeller and downstream element.

Figure 2:
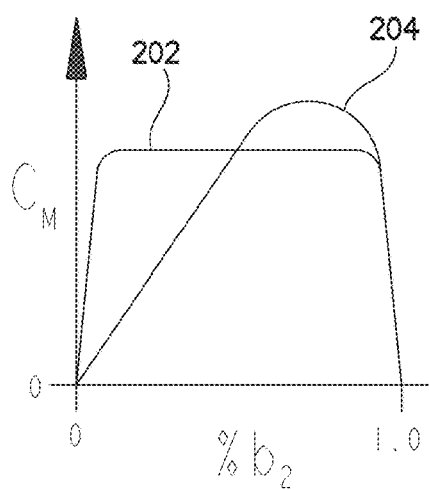
FIG. 2 is a conceptual diagram of a spanwise distribution of meridional velocity, $C_m$, at an impeller exit.
Figure 3:
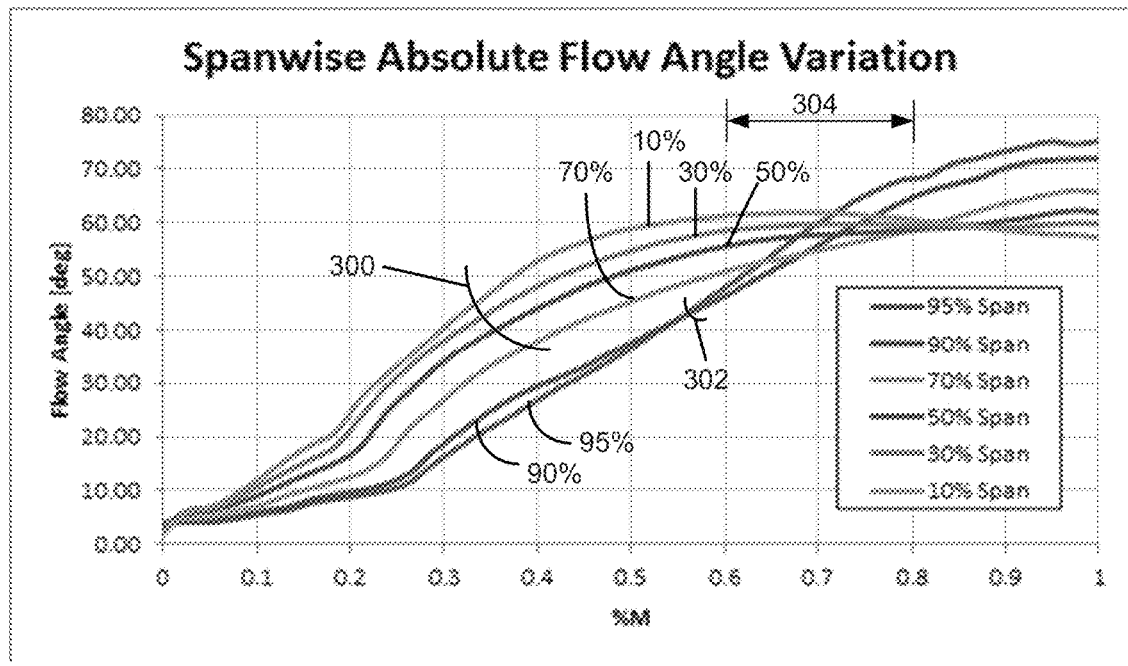
FIG. 3 is a graph of absolute flow angle versus meridional location for various spanwise locations for an exemplary centrifugal compressor at a high flow condition.
Figure 4:
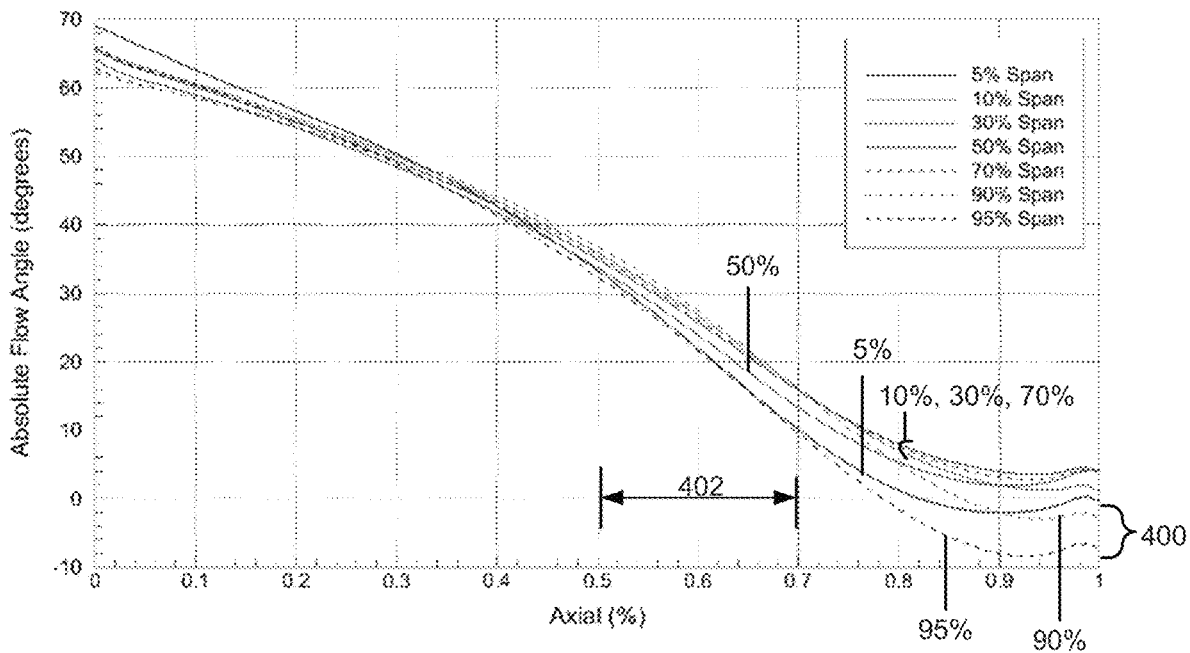
FIG. 4 is a graph of absolute flow angle versus meridional location for various spanwise locations for an exemplary axial turbine.

FIGS. 2-4 illustrate, spatially, how secondary flows can begin to develop and can be concentrated in specific locations in a machine. FIG. 2 conceptually illustrates ideal (202) and common (204) spanwise velocity distributions at an impeller exit, with $C_m$, or the meridional component of an impeller flow absolute velocity, along the vertical axis and % $b_2$, or spanwise location, along the horizontal axis. In the illustrated example, 0 represents the shroud surface and 1.0 the hub surface. As shown, idealized impeller exit flow velocity distribution 202 may include a clean and symmetric profile with thin boundary layers, in actuality, common distribution 204 may include secondary flow with low $C_m$ concentrated along the shroud side of an impeller passage, particularly in the second half or at least an exit portion (in the meridional direction) of an impeller passage. While it is more common for low-energized flow to develop along the shroud surface of a machine, for some machines and operating conditions, the situation may be reversed and lower-$C_m$ secondary flow being more concentrated along the hub surface.

FIG. 3 is an exemplary graph illustrating results of Computational Fluid Dynamics (CFD) calculations of spanwise absolute flow angle variation of an exemplary centrifugal compressor at a steady state high flow condition, with the impeller at approximately 4° of incidence. In FIG. 3, the absolute flow angle, $\alpha$, is plotted on the vertical axis and % M, i.e., percentage of impeller flow path in the meridional direction, is plotted along the horizontal axis, with 0 being impeller leading edge, and 1.0 being impeller trailing edge. The various lines simulate streamtubes at varying spanwise locations (0% being the hub surface and 100% being the shroud surface) averaged in the circumferential direction from blade to blade. As shown in FIG. 3, the first 60-70% of the impeller flow field in the spanwise direction (inner spanwise portion 300) has a fairly tight grouping, with substantially similar absolute flow angles and following a substantially similar trajectory. The trajectory of inner spanwise portion 300 of the streamtubes also tends to flatten out in an exit region of the impeller and tends to approach a nominal exit angle of approximately 60 degrees. Inner spanwise portion 300 roughly approximates the primary flow, and the nominal exit angle of 60 degrees is approximately the primary flow average absolute angle, $\alpha_p$ (see FIG.

1 and corresponding discussion). By contrast, the outer approximately 15-30% in the spanwise direction (outer spanwise portion 302) appears to begin to be dominated by high-angle secondary flow in divergence region 304, which, in the illustrated embodiment occurs by approximately the 70% meridional location of the passage, and diverges to a high-angle flow that is typical of secondary flow fields and that is understood to cause the various losses discussed herein. Similar CFD calculations show the flow field has similar characteristics at lower flow conditions, although the approximate meridional location of divergence region 304 may shift with changes in operating conditions. For example, a meridional location of a divergence region may vary across an operating range of a machine between a maximum upstream location and maximum downstream location. As will be appreciated by a person having ordinary skill in the art, FIG. 3 is merely an example, and the specific percentages and locations can vary, for example, with impeller design and machine type, and the region of high-angle secondary flow may exist on the hub surface in some cases. FIG. 4 similarly illustrates absolute flow angle versus meridional location for a plurality of simulated spanwise streamtubes in an exemplary axial turbine. As shown, the outer 90-95% spanwise flow (outer spanwise portion 400) begins to be influenced by secondary flow in the area of divergence region 402 in an exit portion of the impeller, for example, the divergence region is approximately 50-70% M in the illustrated example, and is characterized by flow angles that diverge from the primary flow field. Thus, as shown in the examples illustrated in FIGS. 2-4, off-angle secondary flow may begin to develop in a divergence region and may be concentrated along either a hub or shroud surface and towards an exit portion of an impeller flow field. As discussed above, such secondary flow represents losses in a turbomachine.

As described more below, the present disclosure includes a variety of flow control structures that are designed and configured to minimize the impact of secondary flows on the performance of a turbomachine to thereby improve turbomachine performance, including operating range, stage pressure rise (for compressors and pumps), and/or stage efficiencies, and in certain cases to improve coupling of an impeller flow field with a downstream element flow field. As also described more below, such flow control structures may be located in both an impeller passageway and a downstream element passageway and extend across and overlap an impeller exit, or they may be located in just an impeller or downstream element passageway. Flow control structures may include flow-guiding channels extending generally in a flow-wise direction and having an angle that is configured and dimensioned to re-direct portions of an impeller flowfield at a preferred angle. Such channels may have a variety of different cross-sectional sizes and shapes and a variety of different depth contours. In some embodiments, such channels may be located in an exit portion of an impeller passageway along a surface having a concentration of secondary flow and the channels may be designed and configured to guide portions of the secondary flow into a downstream element at a preferred direction that reduces exit mixing losses, improves flow stability, and improves the coupling of the impeller and the downstream element. Exemplary flow control structures may also include diffuser side wall curvatures located on a side of the diffuser passageway having higher momentum flow which are designed and configured to influence a flow field on the opposite side of the diffuser passageway, where weaker, lower momentum flow exists, to thereby improve diffuser performance.

Figure 5:
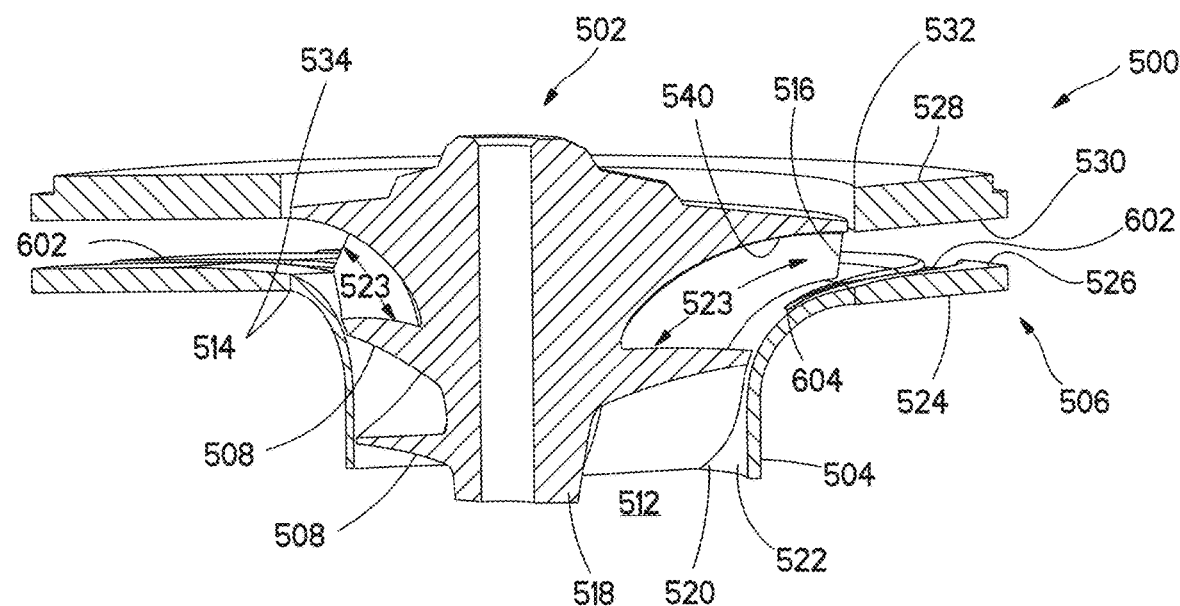
FIG. 5 is a cross-sectional view of a portion of an exemplary centrifugal compressor having flow-guiding channels.
Figure 6:
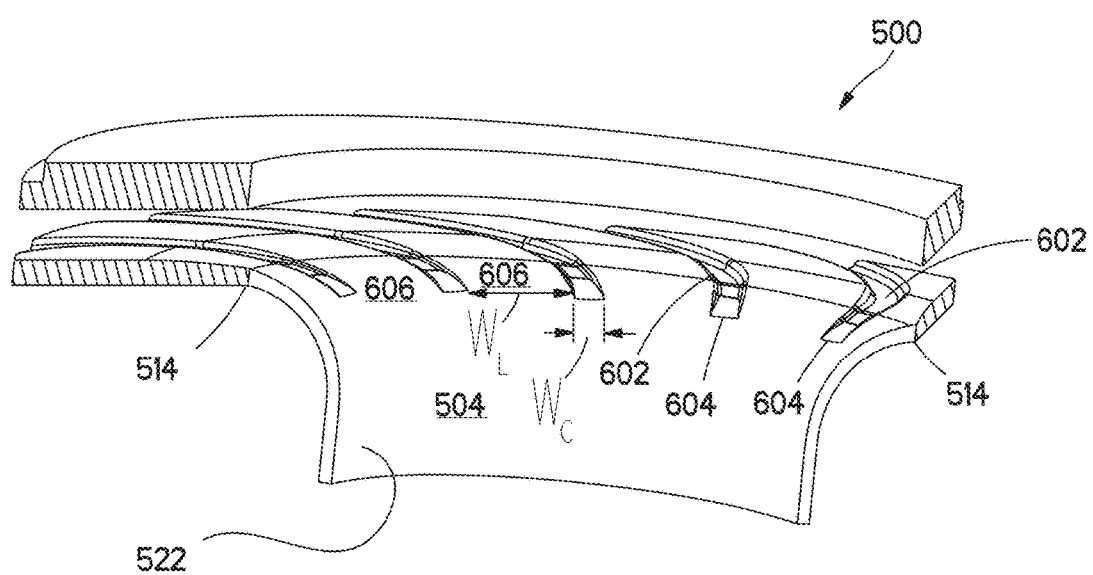
FIG. 6 is an isometric cross-sectional view of the shroud and diffuser of the centrifugal compressor shown in FIG. 5.

FIGS. 5 and 6 illustrate an exemplary centrifugal compressor 500 having an impeller 502 rotatably disposed within an impeller shroud 504 and located upstream of a vaneless diffuser 506. Impeller 502 includes a plurality of blades 508 (only some of which are labeled), as well as an inlet 512 and an exit 514. Impeller blades 508 extend in a meridional direction between a leading edge (not illustrated) and a trailing edge 516 and extend in a spanwise direction between a hub 518 and a shroud side 520 of impeller blade 508. Shroud 504 (sometimes also referred to as a casing) extends from impeller inlet 512 to exit 514 and includes a face 522 confronting shroud sides 520 of impeller blades 508. Impeller hub 518 and shroud 504 define impeller passageway 523 through which a working fluid may be compressed and discharged at exit 514 to diffuser 506. Diffuser 506 includes a front plate 524 defining a front surface 526 and a back plate 528 defining a back surface 530. A diffuser inlet 532 and impeller exit 514 may be substantially aligned with similar sizing such that shroud 504 and diffuser front surface 526 are substantially aligned at impeller exit 514/diffuser inlet 532 and hub 518 and diffuser back surface 530 are similarly substantially aligned at the impeller exit/diffuser inlet. In the illustrated example, impeller 502 is open, such that there is a small clearance between shroud sides 520 of blades 508 and shroud face 522 and the impeller is configured to rotate relative to the stationary shroud 504. Similarly, there is a small clearance between a hub disk outer radius 534 and diffuser back plate 528, whereas shroud 504 and diffuser front plate 524 may not include any such gap and may form one continuous surface between impeller 502 and diffuser 506.

As shown in FIGS. 5 and 6, shroud 504 may include a plurality of flow-guiding channels 602 (only some being labeled to avoid clutter) located circumferentially around the shroud and extending generally in a flow-wise direction from beginning locations 604 within impeller passageway 523, upstream of impeller exit 514, and in the illustrated embodiment, extending into diffuser 506 along front surface 524 of front plate 526. Exemplary channels 602 are designed and configured to guide a portion of the secondary flow developing along shroud 504 in an exit region of impeller 502. For example, spanwise absolute flow angle calculations such as those illustrated in FIG. 3 may be used to determine beginning locations 604 of channels 602. In one embodiment, beginning locations 604 may be proximate a calculated divergence region, for example, divergence region 304 (FIG. 3), where high absolute angle secondary flow begins to develop. As a non-limiting example, beginning locations 604 may be located at a meridional location of approximately 70% for the embodiment illustrated in FIG. 3 and channels 602 may extend to at least impeller exit 514, and in the illustrated embodiment, extend downstream into diffuser 506 to thereby guide and direct secondary flow out of impeller 502 and into diffuser 506 in a preferred direction, which may increase a meridional component of such flow, reduce exit mixing losses, and improve flow stability in an inlet region of diffuser 506.

In one embodiment, a curvature or angle of channels 602 may be substantially the same as a primary flow absolute flow angle $\alpha_p$ (see FIG. 1) and the angle of the channels may be substantially constant along the entire length of the channels. Such primary flow angle may be determined in a variety of ways, including laser velocimetry measurements of an actual machine and/or CFD calculations. For non-limiting example, channels 602 designed and configured for the radial compressor illustrated in FIG. 3, may have a constant absolute angle, $\alpha$, of approximately 60°, for example, an angle that is substantially the same as an average angle that the primary flow approaches in an exit region of impeller 502. As described more below, in other embodiments, channels 602 may have a varying angle. In one example, the angle of channels 602 may approximate a trajectory of the primary flow and may, therefore, have a first angle or a first series of angles for a first portion of impeller 502, for example, upstream of divergence region 304, and may have a second angle or angles for locations downstream of the divergence region, and, in some examples, an angle of the channels may continue to vary at locations downstream of impeller exit 514 and the channels extend into diffuser 506. As described more below, in yet other examples, channels 602 may have an angle that is not substantially the same as a primary flow angle. For example, in a radial machine, the angle may be less than the primary flow angle to direct secondary flow, and in some cases, also direct some primary flow, at an angle that intentionally overshoots the primary flow angle.

Thus, illustrated channels 602, by being located in an exit region of impeller 502 and along shroud 504, may be effective for redirecting secondary flow and for curing a substantial portion of the negative effects of secondary flow discussed above. For example, channels 602 may guide high-angle secondary flow containing significant vorticity and having low meridional momentum into the direction of primary flow and may increase the meridional component of the flow's momentum. The redirected flow in channels 602 may then re-combine with the rest of the impeller exit flow field at locations downstream of impeller exit 514, resulting in reduced exit mixing losses due to a more homogeneous distribution of flow angles and in improved diffuser performance due to, for example, the more stable flow entering diffuser 506.

As described more below, in addition to varying the beginning and ending locations and angle of flow-guiding channels, such as channels 602, all other parameters of channels may also be adjusted and tailored, depending on the design intent and application. For example, as shown in FIGS. 5 and 6, width $W_C$ of channels 602 is less than a width $W_L$ of lands 606 (only some of which are labelled) extending between the channels. In the illustrated exemplary embodiment, $W_C$ is approximately 30% of $W_L$. In other embodiments, the relative width of channels and adjacent lands, the number of channels located in a shroud or hub, and the circumferential spacing of the channels may be varied. Also, in the illustrated example, channels 602 have a maximum depth that is designed and configured to accept the spanwise portion of the impeller flow field dominated by secondary flow. For example, illustrated channels 602 are designed for the exemplary compressor whose flow field performance is illustrated in FIG. 3 and may have a maximum depth in the range of approximately 5%-30% of the spanwise distance between hub surface 540 and shroud face 522 at impeller exit 514. In other embodiments, the maximum depth of channels 602 may be varied, depending on a variety of considerations, including the desired impact of the channels on the turbomachine flow and the desired function of the channels. In some embodiments, maximum channel depth could be less than or equal to 5% of spanwise distance and in other embodiments, may be 50%-100% or greater than 100% of the spanwise distance. A depth contour in the meridional direction may also be varied. For example, illustrated channels 602 have a gradually increasing depth over an initial inlet region extending between beginning locations 604 and impeller exit 514. Such a gradually increasing depth may account for an increasing amount of secondary flow developing along shroud 504. Channel depth may reach a maximum location at a variety of locations, including upstream, adjacent, or downstream of impeller blade trailing edges 516. In the illustrated example, channels 602 reach a maximum depth at a location substantially adjacent trailing edges 516 and then have a substantially constant depth in diffuser 506 until reaching an ending location (not illustrated) where the depth may gradually decrease, resulting in a smooth transition back to the main diffuser passageway.

Flow-guiding channels 602 may also be configured and dimensioned to have a cross-sectional area sized to accommodate a desired volumetric portion of the impeller flow field along the shroud surface that is dominated by secondary flow. In the illustrated example, channels 602 have a substantially square cross section with tapered sidewalls. As discussed below, a variety of other cross sections may be used.

Figure 7:
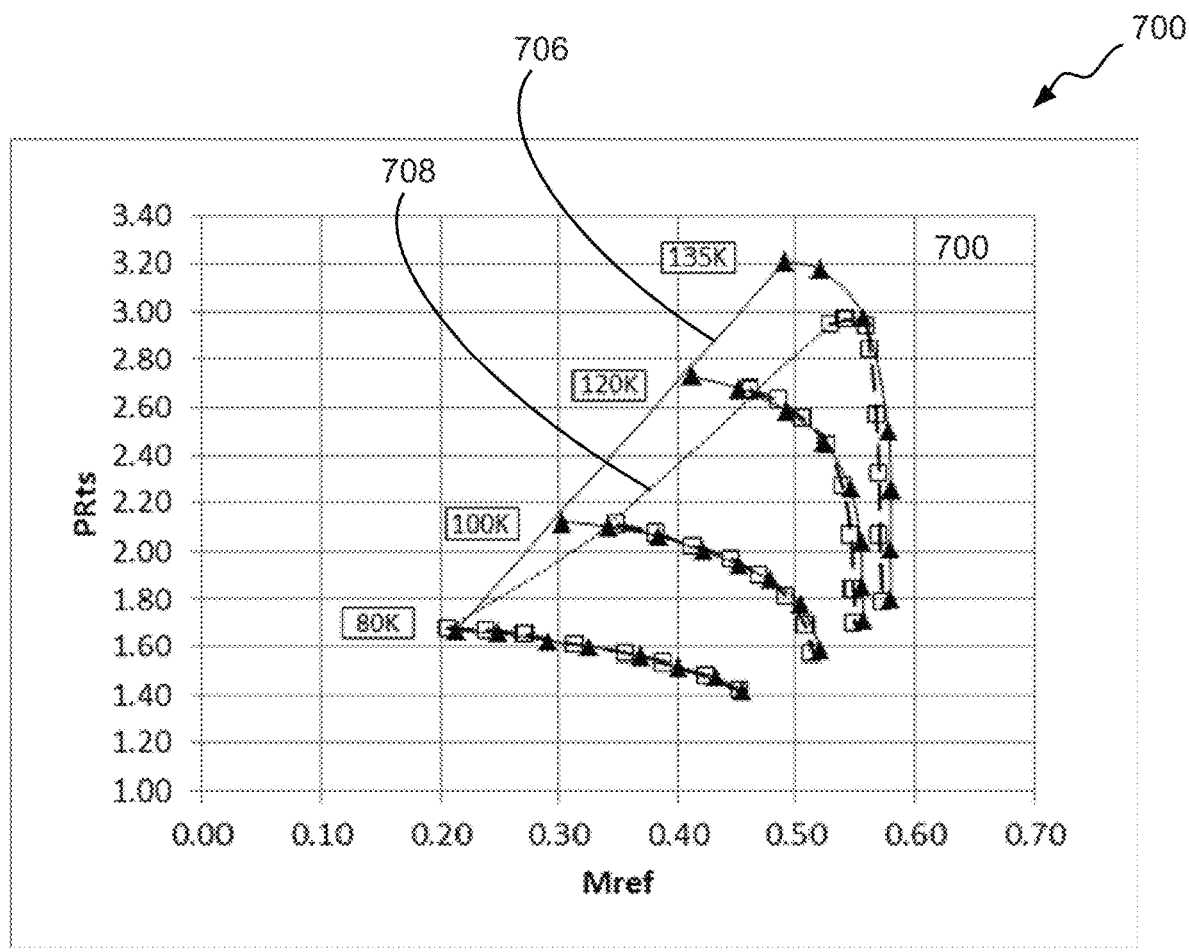
FIG. 7 is a compressor performance map showing test data for a centrifugal compressor with and without flow-guiding channels made in accordance with the present disclosure.

FIG. 7 illustrates exemplary test data showing some of the benefits that may be obtained with flow-guiding channels such as channels 602. FIG. 7 shows a compressor performance map 700, with pressure ratio PRts along the vertical axis and referenced mass flow Mref along the horizontal axis. The square symbol lines are from a vaneless diffuser without flow-guiding channels and the triangular symbol lines are from the same machine with flow-guiding channels such as channels 602. Surge lines 706, 708 for the channel and no-channel cases, respectively, show that channels 602 had an appreciable impact on the compressor surge line, thereby significantly increasing the operating range of the machine. Testing by the present inventor also indicates that the use of flow-guiding channels such as channels 602 also can result in greater work input and higher pressure rise from a compressor stage, as well as improved diffuser performance. While not being limited to a particular theory, the improved performance resulting from channels 602 is believed to be due to removing some of the secondary flow from the main impeller passageway 523 and redirecting the high-vorticity flow at an improved angle, thereby increasing the meridional component of the velocity and momentum of the flow, reducing mixing losses downstream of impeller exit 514, and improving the stability of the flow along diffuser front surface 526.

Figure 8:
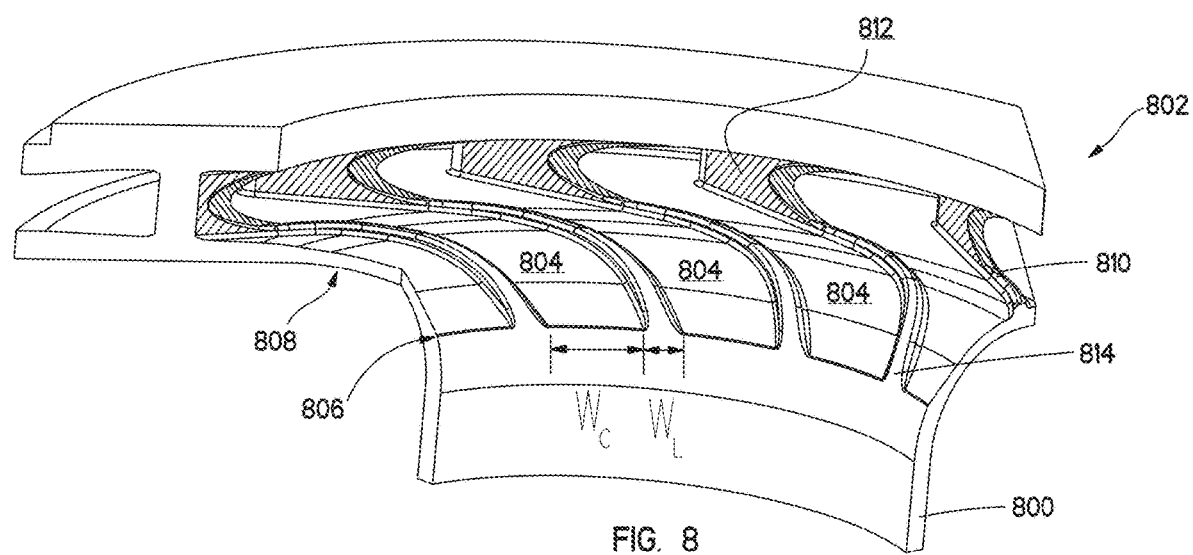
FIG. 8 is a cross-sectional perspective view of another exemplary embodiment of a shroud and diffuser having flow-guiding channels.

FIG. 8 illustrates a portion of another exemplary impeller shroud 800 located upstream of a vaned diffuser 802. As shown, shroud 800 may include flow-guiding channels 804 (only some of which are labeled) for guiding a portion of an impeller flow field. Similar to channels 602, channels 804 may have beginning locations 806 that are upstream of impeller exit 808 and in the illustrated embodiment, the channels may extend into diffuser 802, upstream of leading edges 810 of diffuser vanes 812 (only one of each labeled). In one embodiment, channels 804 may have a substantially constant angle, α, that is approximately the same as the absolute angle of the primary flow component, $α_p$. In some embodiments, the angle of channels 804 may be approximately the same as an angle of diffuser vanes 812 such that the channels may effectively guide flow at the appropriate angle into diffuser 802. In one embodiment, an angle of channels 804 and vanes 812 may be designed and configured as a coupled system, and the angles may be selected based on flow characteristics of a specific impeller. For example, in one embodiment, a method of designing flow guiding channels 804 for a turbomachine with vaned diffuser 802 may include determining an absolute flow angle, $α_p$, of a primary flow component and selecting an angle for channels 804 and vanes 812 based on $α_p$. In one embodiment, an angle of channels 804 and vanes 812 may be substantially the same as $\alpha_p$. Such an approach may be in contrast to prior methods of selecting a diffuser vane angle, which may have required the selection of an averaged angle that includes not only a primary flow angle but also large angles associated with secondary flow. The use of channels 804 to redirect a portion of secondary flow may result in a more homogeneous distribution of flow angles, resulting in the selection of a diffuser vane angle that results in improved diffuser performance and improve impeller-diffuser coupling.

In the illustrated example, a width $W_C$ of channels 804 is greater than a width $W_L$ of lands 814 extending between the channels, and width $W_C$ is approximately the same as a circumferential spacing between vanes 812. In the illustrated example, lands 814 may act as flow-guiding ribs that extend upstream from leading edge 810 of vanes 812, that overlap impeller exit 808 and that extend into the impeller passageway. Thus, exemplary shroud 800 and diffuser 802 include a series of channels 804 and lands 814 extending from an impeller exit portion across impeller exit 808 and into diffuser 802 and may be configured to improve the velocity distribution of an exit flow field at impeller exit 808 and improve coupling of the impeller and diffuser flow fields.

Figure 9:
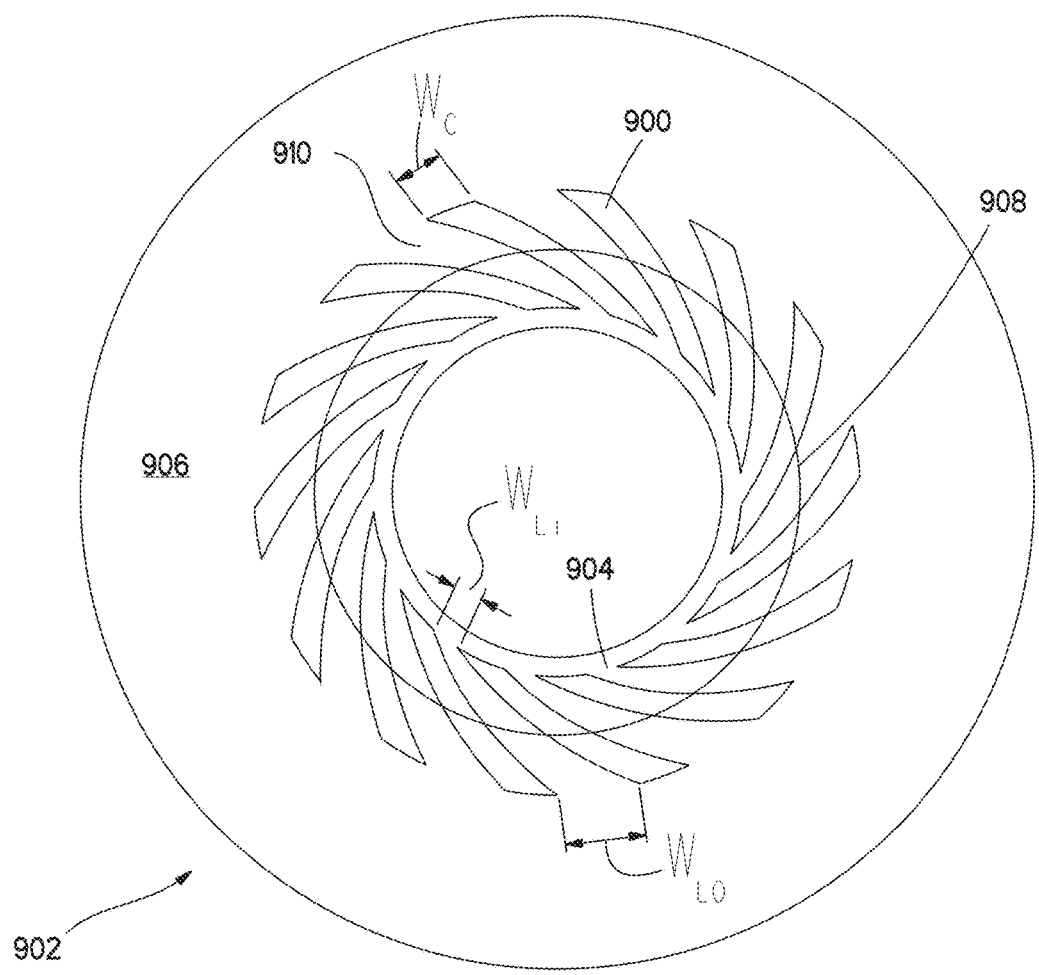
FIG. 9 is a top view of another embodiment of a turbomachine having flow-guiding channels.
Figure 10:
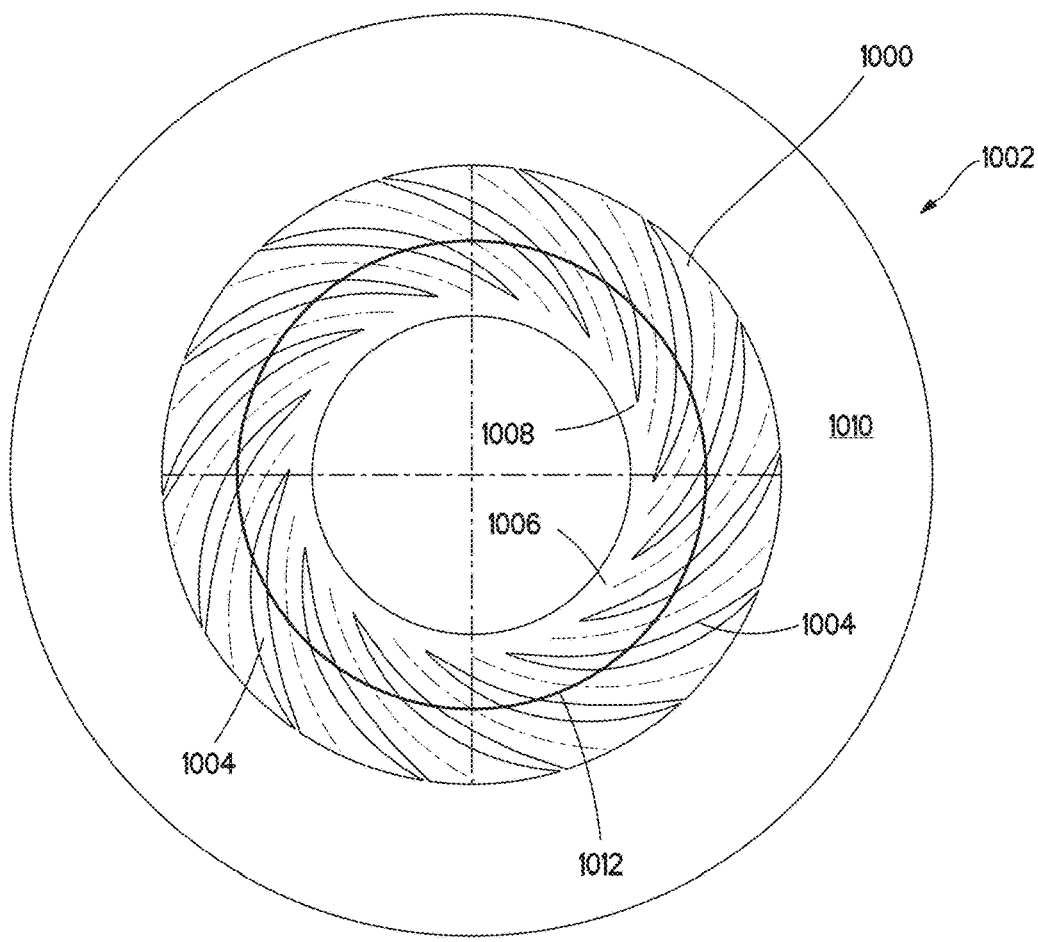
FIG. 10 is a top view of another embodiment of a turbomachine having flow-guiding channels.
Figure 11:
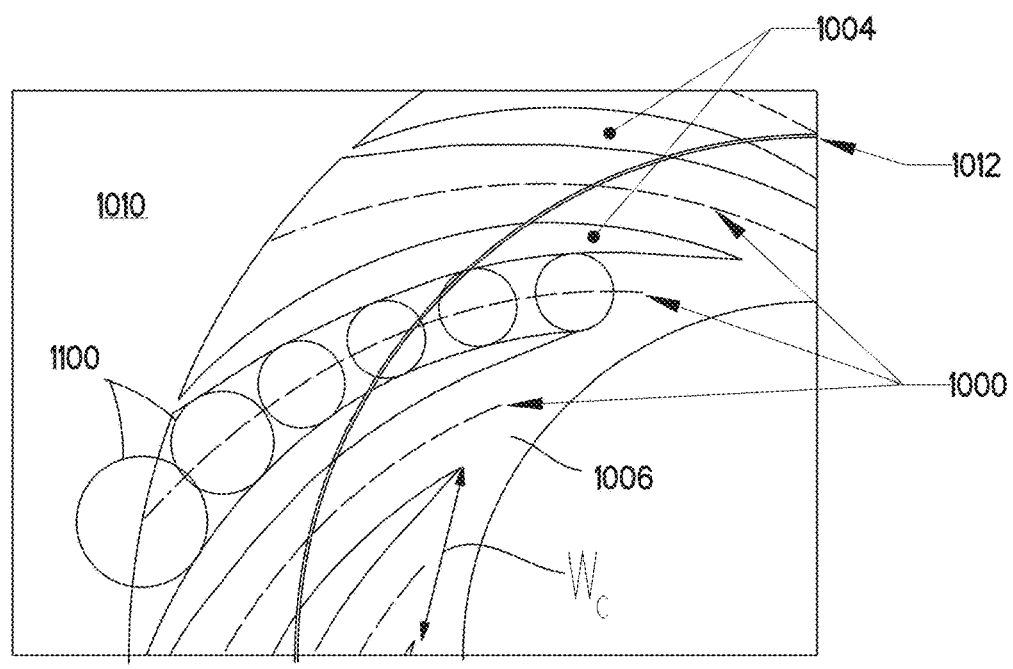
FIG. 11 is a close-up view of a portion of the turbomachine of FIG. 10 illustrating the change in channel width.

FIGS. 9-11 illustrate additional embodiments of flow-guiding channels 900, 1000 (only one of each labeled) disposed in corresponding respective impeller shrouds 902, 1002. As shown in FIG. 9, a casing 902 may include an impeller portion 904, a diffuser portion 906, and an impeller exit 908, and may include a plurality of channels 900 circumferentially disposed around the shroud and that may extend from the impeller portion to the diffuser portion. In the illustrated embodiment, exemplary channels 900 are disposed in a flow-wise direction and have a substantially constant width $W_C$. Channels 900 are separated by lands 910 (only one is labeled) that have an initial width $W_{Li}$ that is approximately the same as channel width $W_C$ and whose width gradually increases to a larger outlet width $W_{LO}$. FIGS. 10 and 11 illustrate an alternative casing 1002 with channels 1000 and lands 1004 (only some of each are labeled), where the lands begin in impeller portion 1006 with substantially zero width and zero depth at points 1008 (only one labeled) and that gradually increase in width in the meridional direction. FIG. 11 is a close-up view of some of channels 1000, and for illustration purposes, includes circles 1100 for graphically illustrating the change in channel width $W_C$ as the channels extend from impeller portion 1006 to diffuser portion 1010. In the illustrated example, channel width $W_C$ is constant in impeller portion 1006 and then increases after passing impeller exit 1012 and entering diffuser portion 1010. In alternative embodiments, flow guiding channels extending into a downstream element may have a reduction in width or cross-sectional area. In alternative embodiments, channels similar to channels 900 or 1000 may be located in various portions of casings 902, 1002. For example, channels made in accordance with the present disclosure may extend along an entire length of a diffuser or may end farther upstream, for example, at impeller exit 908, 1012 and channels may similarly begin farther upstream or downstream. For example, channels may begin upstream of an impeller exit.

Figure 12:
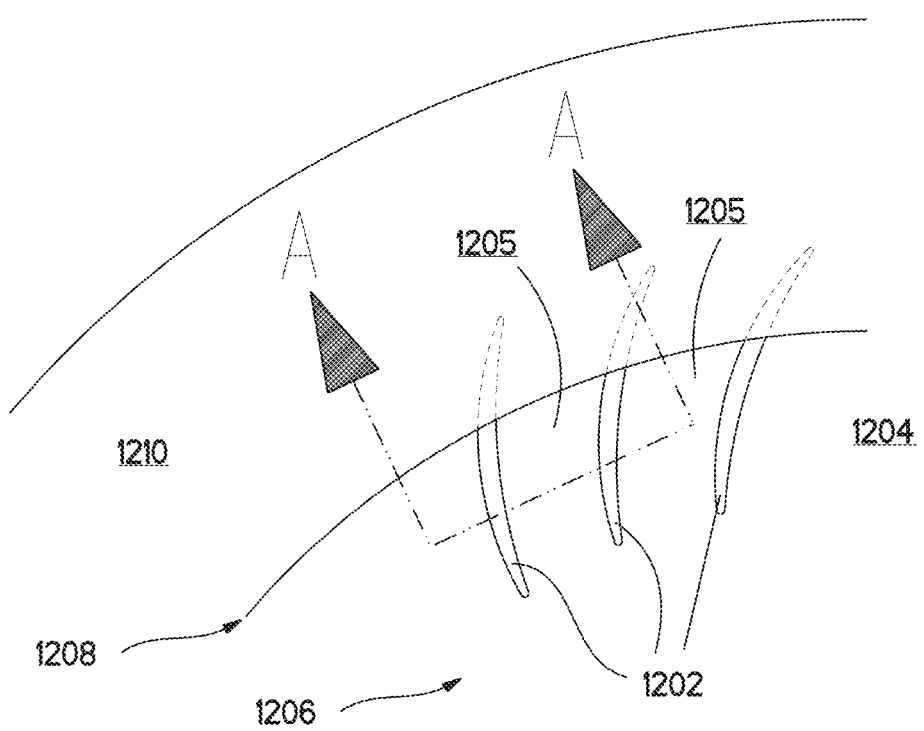
FIG. 12 is a top view of another embodiment of a turbomachine having flow-guiding channels.

FIGS. 12-19 illustrate exemplary channel geometries that may be employed, depending on design intent and application. FIG. 12 illustrates exemplary channels 1202 disposed in a surface 1204, which may be a shroud or hub surface, with lands 1205 extending therebetween. Channels 1202 begin in an impeller region 1206 and as indicated by dotted lines, the channels may terminate at an impeller exit 1208, or may extend into downstream element 1210, which may be any of a variety of turbomachine components, including a diffuser, stator, nozzle, or cascade. As described more below, in one embodiment flow guiding channels, such as channels 1202, may terminate at impeller exit 1208 if an abrupt widening of the flow passage occurs at the impeller exit, such as can occur due to the presence of a smoke shelf. In other embodiments, channels 1202 may end proximate impeller exit 1208 when there is no abrupt increase in passage width.

Figure 13:
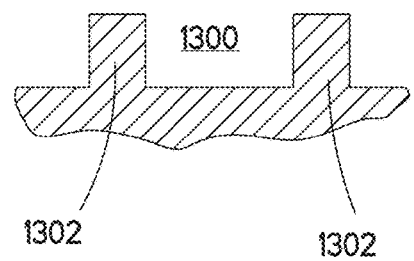
FIG. 13 is a cross-sectional view from the perspective of section A-A of FIG. 12 of an exemplary cross-sectional shape of the flow-guiding channels.
Figure 14:
FIG. 14 is another cross-sectional view from the perspective of section A-A of FIG. 12 of another exemplary cross-sectional shape of the flow-guiding channels.
Figure 15:
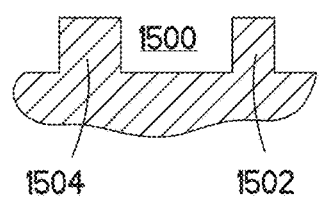
FIG. 15 is another cross-sectional view from the perspective of section A-A of FIG. 12 of another exemplary cross-sectional shape of flow-guiding channels.

FIGS. 13-19 illustrate a cross section at section A-A from FIG. 12 and illustrate various exemplary channel geometries. FIGS. 13 and 14 illustrate substantially square channels 1300 (FIGS. 13) and 1400 (FIG. 14) having alternative widths, with channels 1300 being wider and having correspondingly narrower width lands 1302 and channels 1400 being narrower with correspondingly wider lands 1402. As will be appreciated, any ratio of channel width to land width may be employed, the optimal channel sizing depending on application and design considerations. FIG. 15 illustrates alternative channels 1500 and lands 1502, 1504, where the width of one or both of the channels and the lands may be varied across the machine, here, land 1504 being wider than land 1502. In some embodiments, one or more narrower lands 1502 may be designed and configured as flow-guiding ribs disposed in one or more channels 1500. Channels 1500 may have uniform widths, or may have correspondingly varied widths around the circumference of the machine.

Figure 16:
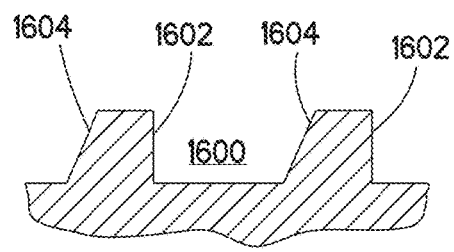
FIG. 16 is another cross-sectional view from the perspective of section A-A of FIG. 12 of another exemplary cross-sectional shape of flow-guiding channels.
Figure 17:
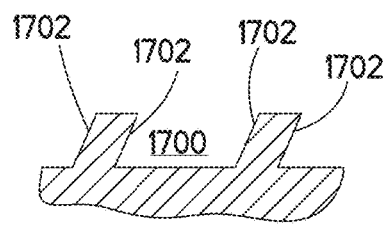
FIG. 17 is another cross-sectional view from the perspective of section A-A of FIG. 12 of another exemplary cross-sectional shape of flow-guiding channels.
Figure 18:
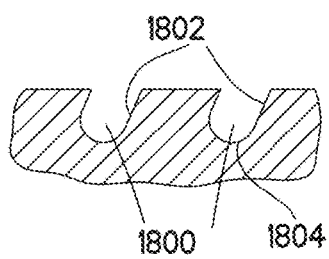
FIG. 18 is another cross-sectional view from the perspective of section A-A of FIG. 12 of another exemplary cross-sectional shape of flow-guiding channels.

FIGS. 16 and 17 illustrate exemplary angled channels 1600 (FIGS. 16) and 1700 (FIG. 17). Exemplary channels 1600 may have a vertical wall 1602 and an angled wall 1604 and exemplary channels 1700 may have two angled walls 1702. Channels with angled sidewalls may provide a variety of design options, including controlling possible unwanted pressure wave interactions between passing impeller blades and channels, and/or for improving the collection of secondary flow by being inclined in the direction of impeller rotation. FIG. 18 illustrates exemplary channels 1800 having a curved cross section. Illustrated channels 1800 also have angled sidewalls 1802 extending from curved portion 1804. As will be appreciated, any of the channel geometries disclosed herein may include a curved portion at the base of the channel, such as curved portion 1804, which may reduce the amount of debris that collects in the channel and improve the ability to clean debris from the channels, such as with one or more of compressed air and a cleaning solution which may be injected via servicing passageways into any of these channels (servicing passageways not illustrated) for the purpose of cleaning as needed. As also will be appreciated, any of a variety of cross-sectional channel depth curvatures may be employed, depending, for example, on the width of the channel and the desired cross-sectional shape.

Figure 19:
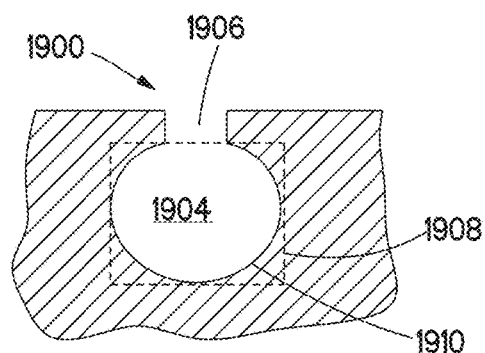
FIG. 19 is another cross-sectional view from the perspective of section A-A of FIG. 12 of another exemplary cross-sectional shape of flow-guiding channels.

FIG. 19 illustrates an exemplary embodiment of a channel 1900 having submerged fluid passageway 1904 in fluid communication with an impeller flow field via an opening 1906. As shown, the cross-sectional shape of submerged passageway 1904 may be varied, including a substantially square (1908) or a substantially circular (1910) cross-sectional shape. Exemplary channel 1900 may cause a more defined separation between secondary flows and a primary flow field by retaining a portion of the flow field within submerged passageway 1904. Such separation may be desirable for increasing the effectiveness of channel 1900 on secondary flow and reducing mixing losses between secondary and primary flows. As will be described more below, exemplary channel 1900 may also be utilized in machines designed to function with multi-phase, and or multi-constituent flow.

Figure 20:
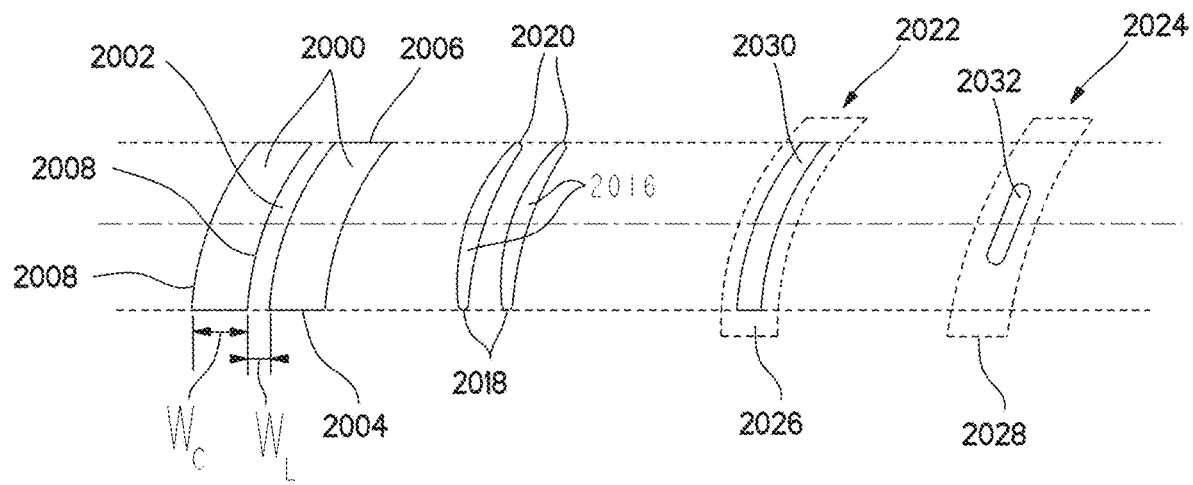
FIG. 20 illustrates top views of exemplary channel geometries.

FIG. 20 illustrates exemplary channel geometries when viewed from above, as in when viewed from a center of an impeller passageway and looking outward to a channel disposed in a shroud or hub surface. FIG. 20 shows, by way of example, channels 2000 with relatively wide widths $W_C$ as compared to a width $W_L$ of land 2002 extending therebetween. A depth of channels 2000 may be substantially zero at inlets 2004 and outlets 2006 and may increase to a maximum depth at a point between the inlet and exit, and edges 2008 may meet inlets 2004 and outlets 2006 to form a substantially rectangular inlet and exit. Channels 2016 may have relatively narrower widths $W_C$ and may have tapered inlets 2018 and outlets 2020. Channels 2022 and 2024 may have submerged passageways 2026 and 2028, with the submerged passageways shown in dashed line to indicate they are below the surface of the page and surface of the corresponding component of the machine, and the channels may include openings 2030 and 2032 for communicating flow to the submerged passageways. As shown, exemplary opening 2030 is of similar size and shape to submerged passageway 2026, while opening 2032 is substantially smaller than submerged passageway 2028.

In one embodiment channels with submerged passageways, such as channels 1900, 2022, and 2024, may be used to duct some portion of the impeller flow field to another location. In one example, any one of the ducts disclosed in U.S. Pat. No. 6,699,008, issued Mar. 2, 2004, and titled "Flow Stabilizing Device," such portions relating to ducts being incorporated by reference herein, may be used with channels having submerged passageways, where the channel may be terminated into the duct 138. In other embodiments, flow from a channel may be removed from the principle flow path and routed for other purposes, such as for thrust management in a highly loaded turbomachine system, use as cooling flow, such as in modern gas turbines, used for cooling in any other processes, to support a chemical reaction process, or for removing unwanted constituents from the system.

Figure 21:
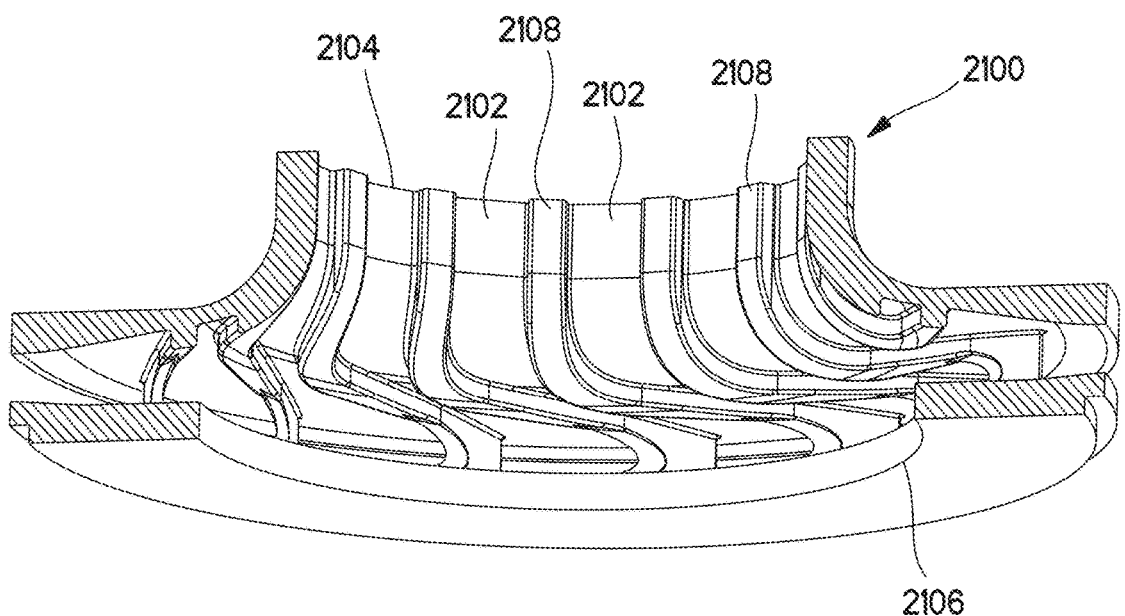
FIG. 21 is a cross-sectional perspective view of another exemplary embodiment of a shroud and diffuser with flow-guiding channels for a turbomachine designed to operate with two-phase and/or multi-constituent flow.
Figure 22:
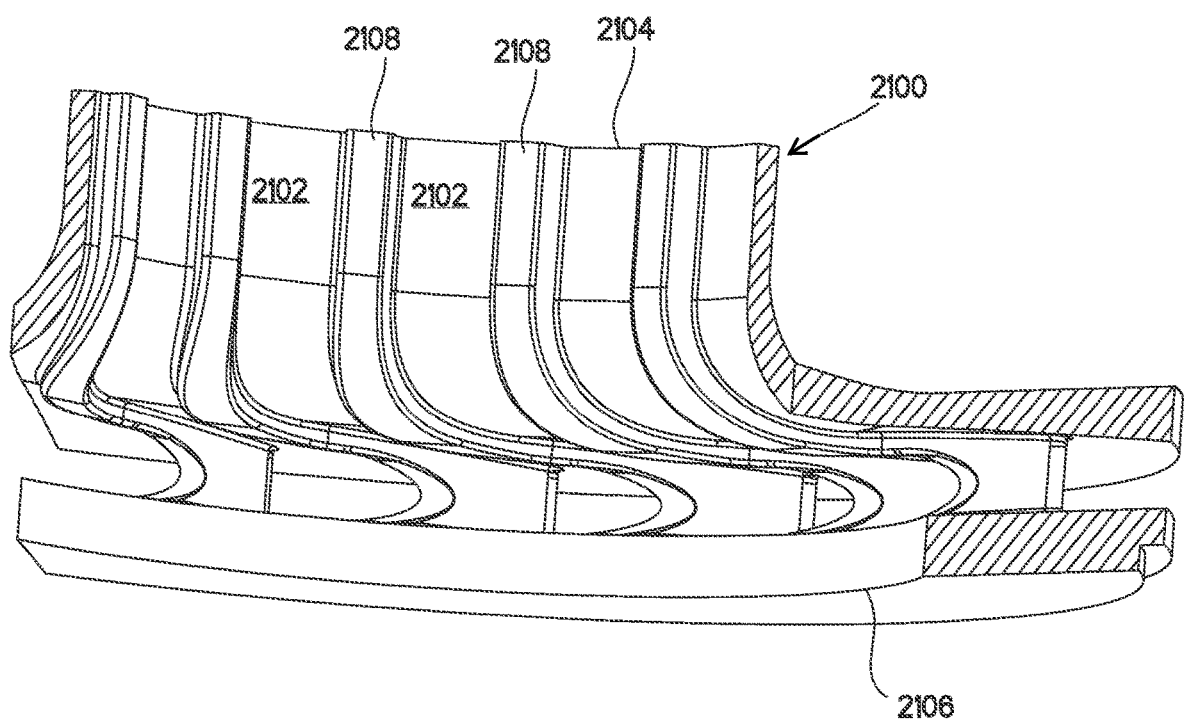
FIG. 22 is another cross-sectional perspective view of the shroud and diffuser of FIG. 21.

As discussed above, size, shape, and location of flow guiding channels may be varied depending on application and design intent. FIGS. 21 and 22 illustrate an exemplary embodiment of impeller shroud 2100 having channels 2102 (only two labeled) that may be designed and configured for two-phase and/or multi-component flows. As is known in the art, two-phase pumping of liquid and vapor of the same molecular constituency occurs in many applications, and current pumps have a limit as to how much vapor they can tolerate before the head characteristic collapses and severe damage begins to occur to the pump. Oftentimes, operating limits are imposed on a system to prevent any, or at least a substantial amount of, vapor from being present in a pump. Also, there is a need for more robust pumping capability for multi-component flows, such multi-component flows including, for example, 1) a predominate single gas or a mixture of gases carrying with it suspended droplets, bubbles, or particles (solids), 2) a predominate liquid carrying along with it suspended bubbles (other than vapor of the same molecular structure) or particles (solids), or 3) more complex systems of miscible or immiscible liquids and various gases and solids (for example, much of the effluent from oil wells is just such a complex mixture of different phases and components).

Design considerations for designing a pump that can handle some amount of two-phase flow include designing the impeller to create sufficient head rise before the flow reaches the end of the impeller passage to force the vapor to return to a liquid state via the higher pressure. Another consideration is providing a sufficient cross-sectional area to allow for the flow of liquid and vapor, where the latter may require much more area. Exemplary shroud 2100 and channels 2102 are designed and configured to enable two-phase pumping. Exemplary channels 2102 extend over a longer portion of shroud 2100 than, for example, channels 602 (FIGS. 5 and 6) and 804 (FIG. 8) and, in the illustrated example, the channels extend across the entire length of shroud 2100, from impeller inlet 2104 to impeller exit 2106. Depending on application, channels 2102 may be sized with a relatively larger cross-sectional area and volume than channels designed for single phase operation to handle an intended volumetric flow of liquid and vapor. Illustrated channels 2102 and adjacent ribs 2108 may be designed to collect a majority of vapor that exists in the impeller flow field (vapor naturally tending to concentrate near shroud 2100 due to high local velocities and other effects), thereby removing the vapor from the main impeller passage. By removing the vapor from the impellers, the head rise generated by the impellers will not be as appreciably impacted by the vapor as it would have been had the vapor remained in the impeller passageway. In one embodiment, the system may be configured to generate a sufficient head rise that may be imparted over onto the vapor in channels 2102 to force a significant portion or substantially all of the vapor to transition to liquid at or before leaving the impeller.

In one embodiment, channels 2102 may be configured and dimensioned to emphasize a positive-displacement pumping effect that may occur in flow-guiding channels made in accordance with the present disclosure. While not being limited to a particular theory, in some embodiments, a turbomachine that includes flow-guiding channels disclosed herein may be considered to be a hybridized machine in that the work done on flow in the channels is a positive displacement (PD) type of work, (where fluid in channels such as channels 2102 may be pushed along the channels a finite distance by blade forces) rather than work directly reflected in a change in angular momentum as in the case of work imparted by continuous rotation of blades of an impeller, thereby creating a hybrid turbo-positive displacement, or turbo-PD machine. Flow-guiding channels may be designed and configured to emphasize this effect. Conversely, PD-type work may be minimal in some embodiments of flow-guiding channels disclosed herein. In one embodiment, channels 2102 may be configured and dimensioned to emphasize PD forces which may facilitate pumping of vapor outside of the direct impeller passage (the passage extending in a spanwise direction between an impeller hub surface and the shroud-sides of the impeller blades (not illustrated in FIGS. 21 and 22)) by the action of passing blades of the impeller, which may provide a series of impulse forces to help sweep the flow along the flow-wise oriented shroud channels 2102. Area scheduling of channels 2102 for a particular case may include considerations such as ensuring sufficient cross-sectional area to allow for the vapor or gas volume corresponding to the local values of density. Channels 2102 with larger cross-sectional areas may be required for larger amounts of vapor of other secondary constituents.

Figure 23:
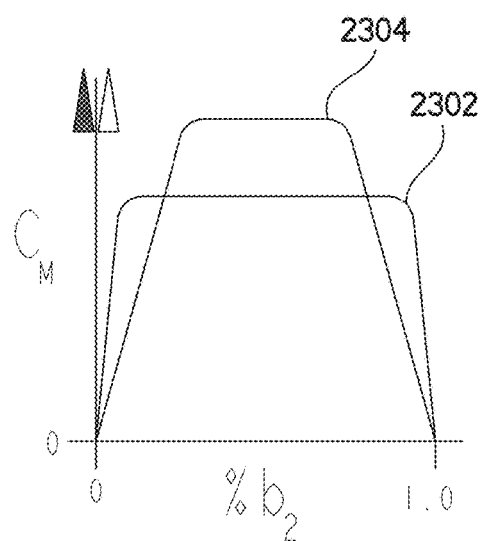
FIG. 23 is a diagram of a spanwise meridional velocity distribution at an impeller exit for two different idealized profiles.
Figure 24:
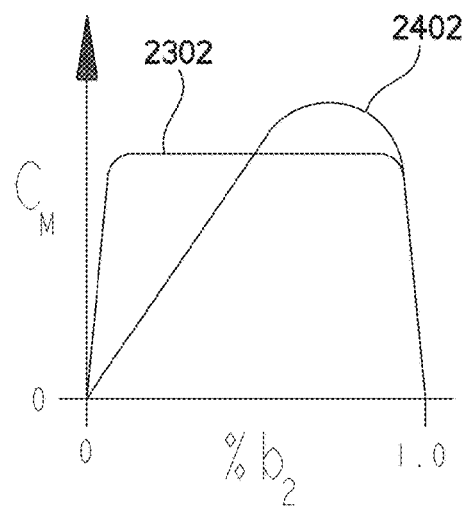
FIG. 24 is a diagram of a spanwise meridional velocity distribution at an impeller exit for an ideal and a common profile.

Channels disclosed herein may also be used to create preferred velocity profiles as the flow leaves the impeller and enters a downstream element such as a diffuser, which may improve diffuser performance. FIGS. 23-26 conceptually illustrate impeller velocity and angle distributions that may influence the design of flow-guiding channels and ribs disclosed herein. FIG. 23 is a conceptual plot of a spanwise meridional velocity distribution, with meridional velocity, $C_m$, on the vertical axis, and spanwise location, $b_2$, on the horizontal axis, with, in the illustrated example, 0 being the shroud and 1.0 being the hub. FIG. 23 illustrates idealized symmetric, clean profiles, with a profile 2302 showing thin inlet boundary layers and a profile 2304 showing a profile with greater boundary layers and associated aerodynamic or hydrodynamic blockage. FIG. 24 compares ideal profile 2302 with a typical impeller exit profile 2402, which is characteristic of many medium to high specific speed stages. FIG. 24 illustrates how the meridional component of velocity, $C_m$, may be significantly less than ideal near the shroud and hub, and in many cases, more so along the shroud ($b_2$ near 0), for example, for reasons discussed above in connection with secondary flow.

Figure 25:
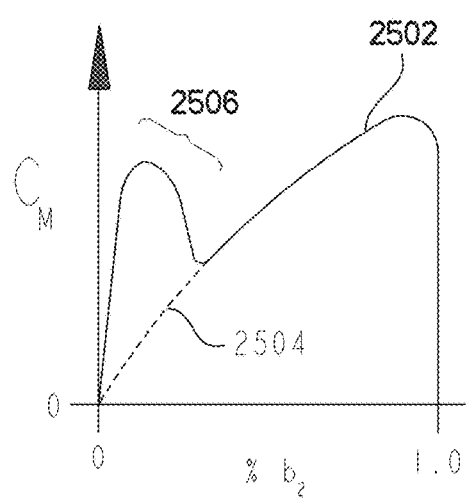
FIG. 25 is a diagram of a spanwise meridional velocity distribution at an impeller exit for a velocity profile augmented by flow-guiding channels.
Figure 26:
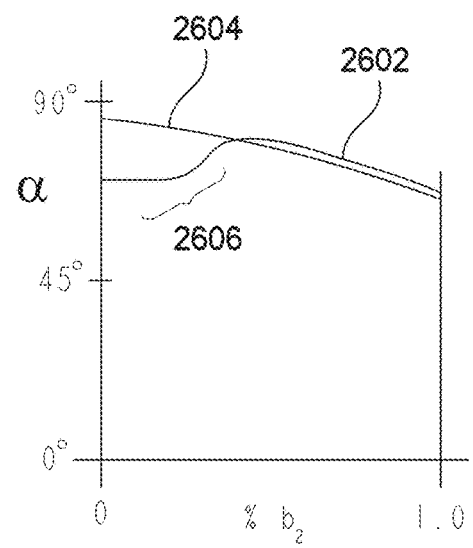
FIG. 26 is a diagram of spanwise absolute flow angle distribution at an impeller exit for a common and an augmented profile.

FIGS. 25 and 26 illustrate an augmented velocity profile 2502 (FIG. 25) and an augmented angle profile 2602 (FIG. 26), where flow-guiding channels disclosed herein may be located along one or both of shroud and hub surfaces on either an open or covered impeller to re-direct flow in a direction that increases the meridional velocity component of the flow (FIG. 25) and improve the angle of the flow (FIG. 26). Example embodiments of hub-side channels are discussed below, as well as shroud-side channels for covered impellers, i.e., impellers that are not open or partially open. In one embodiment, a size of the channels may be adjusted to tailor the extent to which the velocity profile is augmented. For example, a size and configuration of channels may be selected for capturing and directing secondary flow and, in some cases, a certain amount of primary flow, along one or both of shroud and hub surfaces to create velocity profiles that are more energetic along the shroud and hub. Such augmenting of the flow to energize the flow at these regions may improve downstream diffuser performance. Thus, a size and geometry of flow-guiding channels may be configured and dimensioned to eliminate hydrodynamic blockage and improve downstream diffuser performance. FIG. 26 shows absolute flow angle, α, on the vertical axis and spanwise location, $b_2$, on the horizontal axis, and compares augmented angle profile 2602 to a common profile 2604. As discussed above, while it is common for flow distributions to have large angles along the shroud surface which may cause a variety of performance issues, channels disclosed herein may be used to reduce the angle along the hub or shroud surface. As shown in FIGS. 25 and 26, flow guiding channels may be designed and configured to augment a flow field such that redirected flow along hub or shroud has an angle or meridional velocity component that is greater than, or overshoots an angle or meridional velocity component of the primary flow. For example, channels with an angle that is in between a primary flow angle at an inlet of an impeller and a primary flow angle at an exit of an impeller may be used to adjust augmented portion 2606 of an impeller flow field. As shown in FIG. 26, the angle distribution along the shroud may be increased or decreased as needed for specific design applications. Similar effects may be achieved in the meridional velocity distribution (FIG. 25) to increase or decrease the magnitude of augmented portion 2506 relative to common profile 2504.

Figures 27, 28:
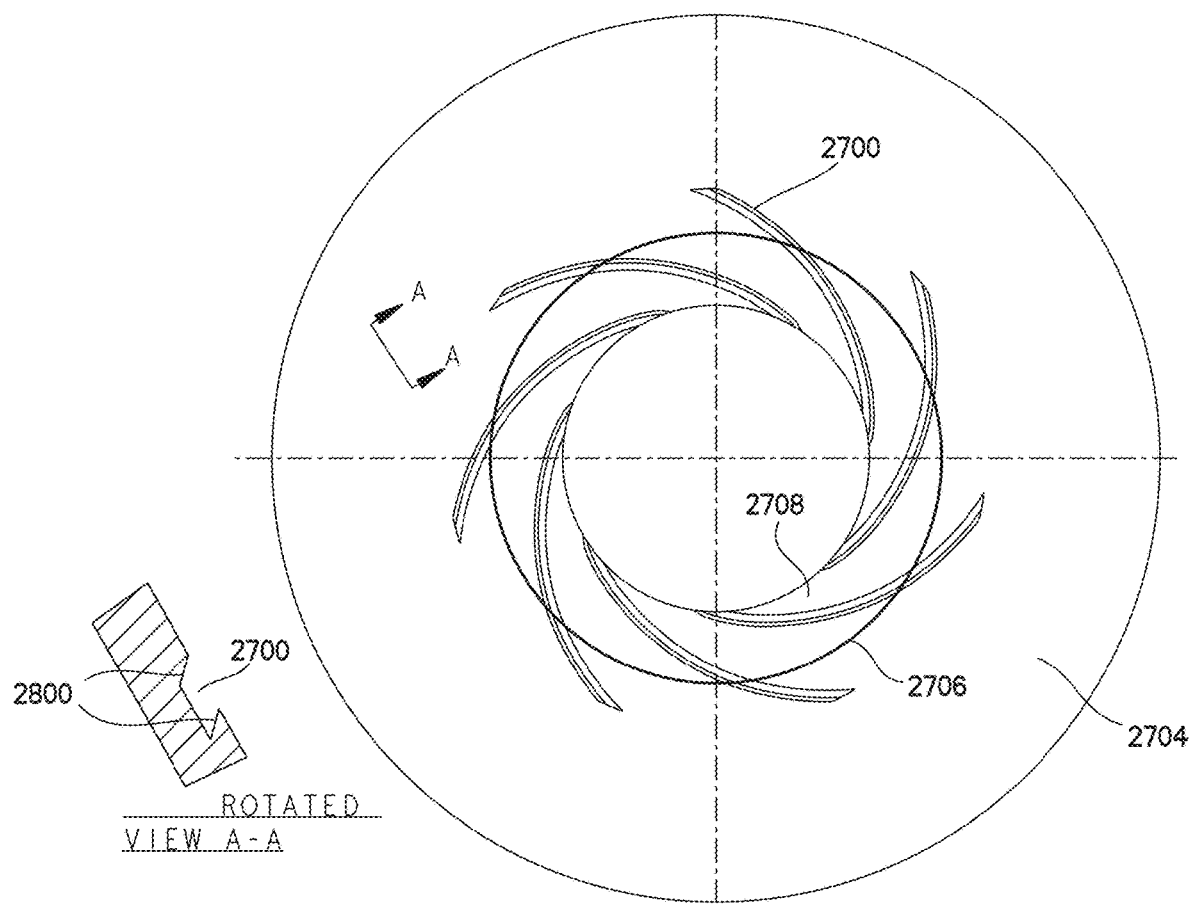
FIG. 27 is a top view of another embodiment of a turbomachine having flow-guiding channels.
FIG. 28 is a cross-sectional view of one of the channels of FIG. 27.
Figure 29A:
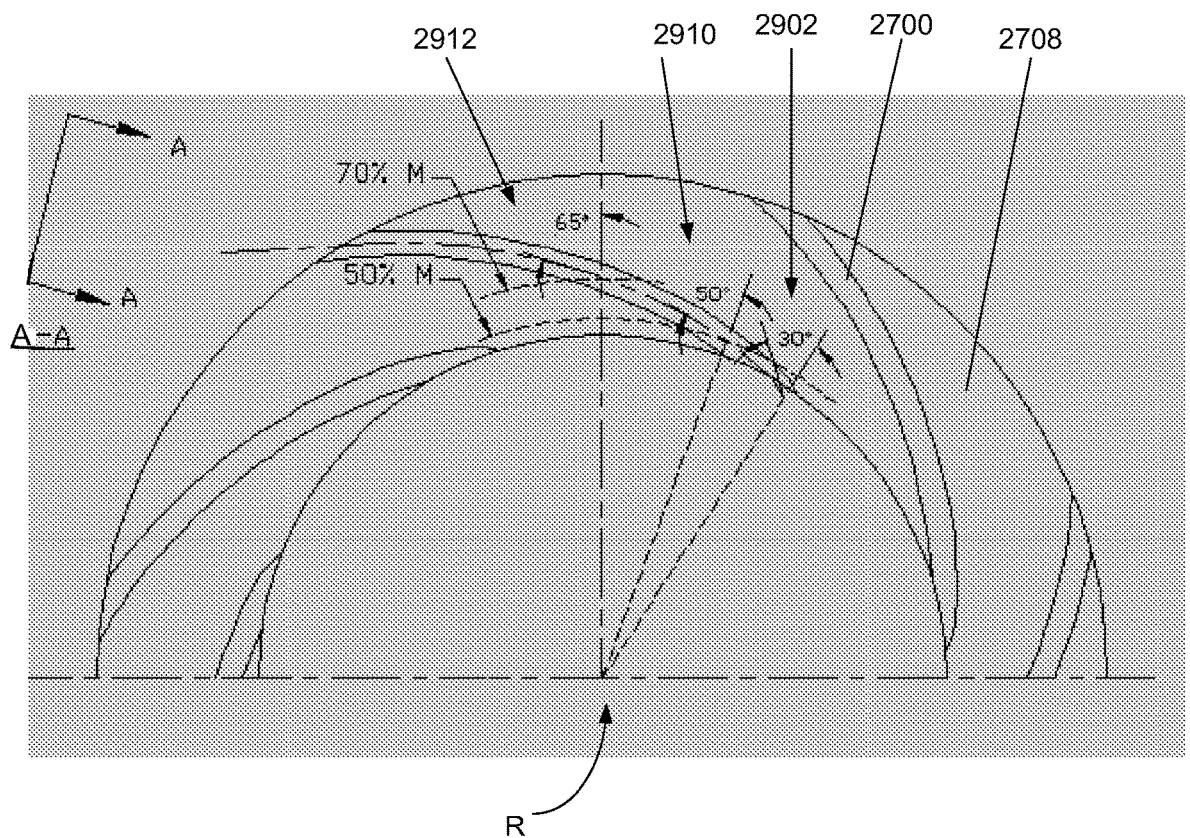
FIG. 29A is a top view of a portion of the turbomachine of FIGS. 27 and 28.
Figure 29B:
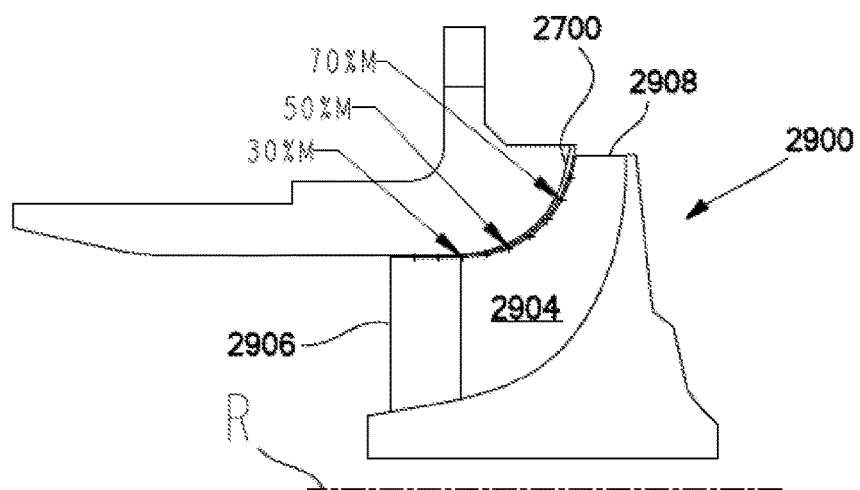
FIG. 29B is a cross-sectional side view of the turbomachine of FIGS. 27-29A.

FIGS. 27-29B illustrate another embodiment of flow-guiding channels 2700 generally extending in a flow-wise direction but having a varying angle. Exemplary channels 2700 may be located in shroud 2708 and diffuser front surface 2704 and extend across impeller exit 2706. As shown in FIG. 28, which is a cross-sectional view of section A-A from FIG. 27, channels 2700 may have sidewalls 2800 that are inclined in a direction of rotation of impeller 2900 (FIG. 29B). FIGS. 29A and 29B further illustrate channels 2700, with FIG. 29A showing a top view of a portion of shroud 2708 and FIG. 29B showing a cross-sectional side view of shroud 2708 assembled with impeller 2900. As shown in FIG. 29A, an angle, α, of channels 2700 varies along the length of the channels, where α is measured in an absolute frame of reference from a meridional reference plane extending through axis of rotation R (extending into and out of the page in FIG. 29A). In the illustrated example, angle α of channels 2700 is variable in the meridional direction, with the channels having four different portions each extending at a different angle. Channels 2700 include first portion 2902, which extends from 30% M to 50% M and has an angle, α, of 30 degrees (where M is the meridional distance of impeller blades 2904 (FIG. 29B), 0% M being impeller blade leading edge 2906 and 100% M being impeller blade trailing edge 2908). Channels 2700 also include second portion 2910 extending from 50% M to 70% M and having an angle of 50 degrees, and third portion 2912 extending from 70% M to beyond 100% M and having an angle of 65 degrees. The varying angle of channels 2700 may be designed and configured to correspond to a trajectory of a primary flow component of an impeller flow field. For example, the angles of first, second, and third portions 2902, 2910, and 2912 may correspond to an average absolute angle of a primary flow associated with a particular machine. By locating channels 2700 along shroud 2708, the channels may be effective for redirecting a portion of working fluid adjacent the shroud, for example a weak portion of the working fluid having a low meridional velocity and high flow angle. Channels 2700 may have a constant angle along diffuser front surface 2704 (FIG. 27) for guiding the secondary flow into the diffuser, or may have a varying angle. As will be appreciated by a person having ordinary skill in the art, the number of portions, the specific angles, and the meridional locations may vary with application and design intent. For example, channels made in accordance with the present disclosure may have less or more than three constant angle portions, or they may have one or more portions with a continuously variable angle.

Figure 30:
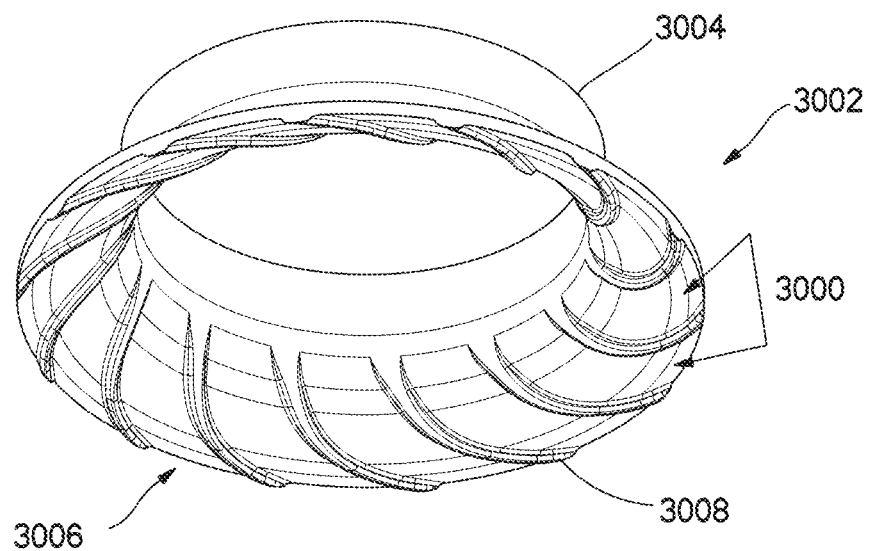
FIG. 30 is a perspective view of another embodiment of a shroud with flow-guiding channels.
Figure 31:
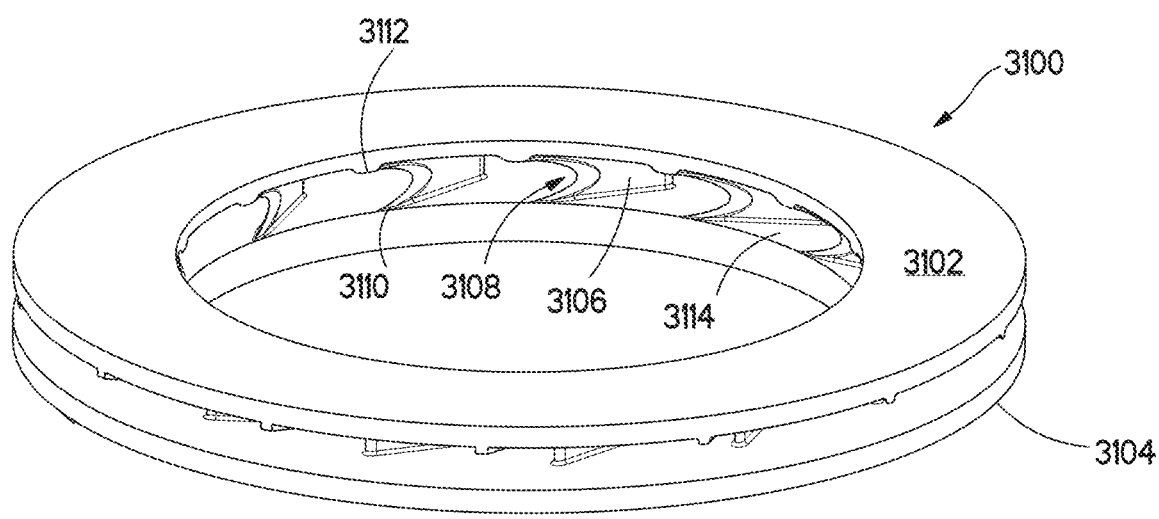
FIG. 31 is a perspective view of a vaned diffuser configured to mate with the shroud of FIG. 30.
Figure 32:
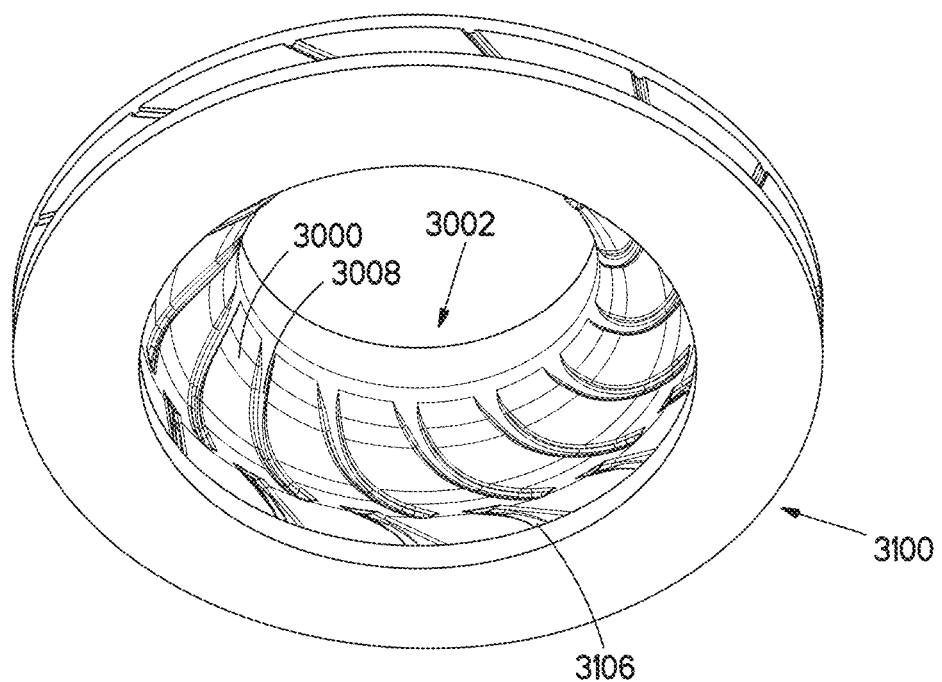
FIG. 32 is a perspective view of the shroud of FIG. 30 and the diffuser of FIG. 31 assembled and showing the flow-guiding channels in a clocked position relative to the diffuser vanes.

FIGS. 30-32 illustrate another example of flow guiding channels 3000 in a shroud 3002 in combination with vaned diffuser 3100. Illustrated channels 3000 begin downstream of an FIGS. 30-32 illustrate another example of flow guiding channels 3000 in a shroud 3002 in combination with vaned diffuser 3100. Illustrated channels 3000 begin downstream of an impeller inlet 3004 and upstream of an impeller exit 3006 and are separated by ribs 3008 extending in a flow-wise direction and terminating at the impeller exit. A diffuser 3100 includes a top plate 3102, a bottom plate 3104, and vanes 3106 extending therebetween. Exemplary vanes 3106 may have a curved leading edge 3108 with lower and upper legs 3110, 3112 extending to diffuser inlet 3114. As shown in FIG. 32, shroud 3002 is designed and configured to mate with front plate 3102 of diffuser 3100. As shown in FIG. 32, the location of channels 3000 and ribs 3008 may be "clocked" with respect to a location of vanes 3106. In the illustrated example, a trailing edge of ribs 3008 may be located approximately at a midpoint between adjacent vanes 3106. In other embodiments, other relative positions of shroud 3002 relative to diffuser 3100 may be used. In the illustrated example, shroud 3002 has the same number of ribs 3008 and channels 3000 as the number of vanes 3106. In other embodiments, the numbers may not be the same. As will be appreciated, any number of clocked orientations and ratios of the number of channels 3000 to vanes 3106 may be used. In one example, the number of channels may be larger than the number of vanes, and a portion of the leading edges of diffuser vanes may extend upstream and form ribs between some channels (similar to diffuser 802 and vanes 812 of FIG. 8), and other channels may be defined by lands or ribs that extend between adjacent diffuser vanes, such as in the embodiment illustrated in FIG. 32.

Figure 33A:
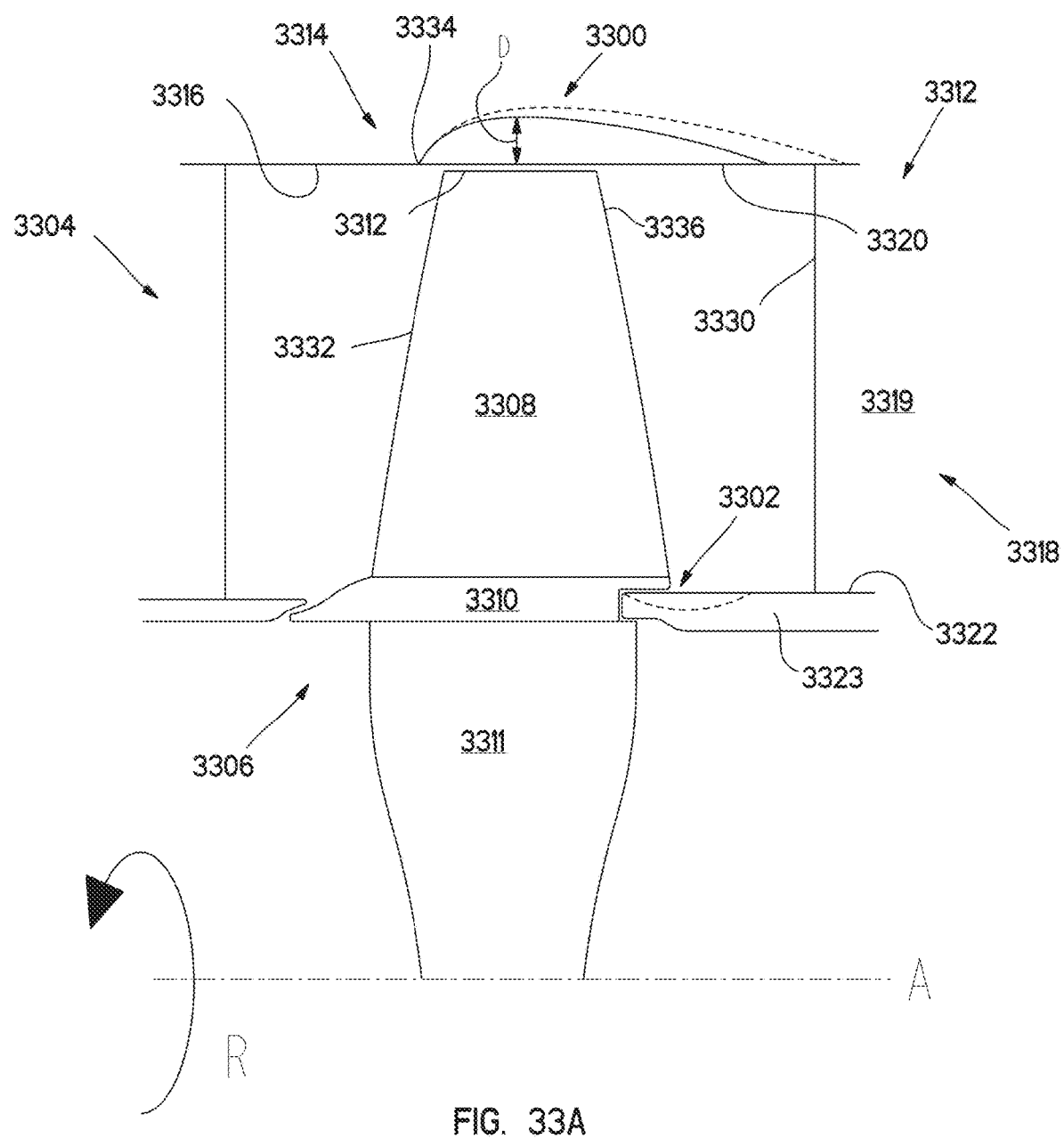
FIG. 33A is a side view of an exemplary axial machine having flow-guiding channels.
Figure 33B:
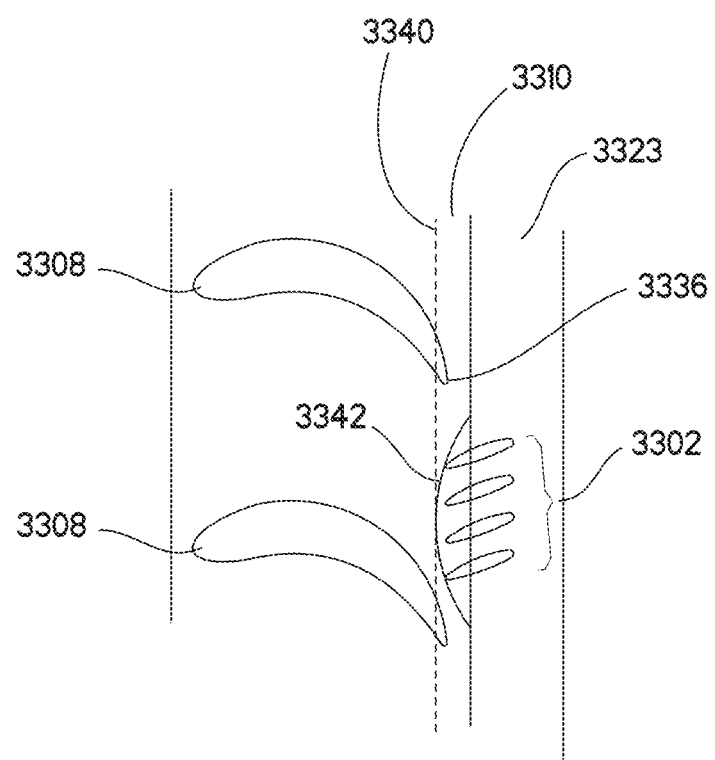
FIG. 33B is a top view of a portion of the turbomachine of FIG. 33A.

FIGS. 33A and 33B illustrate exemplary flow guiding channels 3300, 3302 applied to an axial machine 3304, which may be any type of axial machine, including a turbine, compressor, or fan. Axial machine 3304 may include an impeller 3306 having blades 3308 (only one illustrated) extending between a hub 3310 and a shroud side 3312 of the blades. Blades 3308 and hub 3310 are fixed to a disk 3311 and are configured to rotate about axis of rotation A in the direction of arrow R. Impeller 3306 is configured to rotate relative to a shroud 3314, with shroud face 3316 confronting shroud sides 3312 of blades 3308. Impeller 3306 is located upstream of a downstream element 3318 which may include a blade 3319, for example, a stator vane, and front and back surfaces 3320, 3322.

In the illustrated embodiment, axial machine 3304 includes flow-guiding channels 3300 along shroud 3314 and flow-guiding channels 3302 in back surface 3322, located downstream of hub 3310. Although not shown in FIG. 33A, illustrated channels 3300 and 3302 may each be one of a plurality of channels spaced circumferentially about the machine. Channels 3300 and 3302 may have any of the variety of cross-sectional geometries and depth profiles disclosed herein. As shown, shroud-side channels 3300 may extend along an entire length of shroud sides 3312 of blades 3308, and as indicated by the solid and dashed lines, may terminate at various locations including upstream of leading edge 3330 of blade 3319, or downstream of the leading edge of the stator vane. Beginning location 3334 of channels 3300 may be upstream of leading edge 3332. In other embodiments, beginning location 3334 may be located farther upstream, for example, upstream of leading edge 3332 of impeller blades 3308, such as proximate a divergence region of the impeller flow field (see FIG. 4 and accompanying discussion). Illustrated channels 3300 may have a depth, D, that is substantially zero at beginning location 3334 and that may gradually increase to a maximum depth. As shown in FIG. 33A, depth D of channels 3300 may begin to decrease after reaching a maximum depth, or the channels may have a substantially constant depth for some distance before beginning to decrease. A location of maximum depth may vary. In one embodiment, the location of maximum channel depth may be at, or downstream of trailing edge 3336 of blade 3308 and in some embodiments, may be downstream of leading edge 3330 of blade 3319. Thus, channels 3300 may guide a portion of secondary flow developing along shroud 3314 towards a preferred direction and thereby increase performance of impeller 3306 and stator 3318.

As shown in FIGS. 33A and 33B, axial machine 3304 may also include hub-side channels 3302. Channels 3302 may be located in back surface 3322 of stator platform 3323 and hub 3310 may be cutback such that trailing edge 3336 may be downstream of cutback portion 3340 (FIG. 33B) of hub 3310, thereby providing fluid communication between flow proximate hub 3310 and channels 3302. Although only four channels 3302 are illustrated, additional channels may be included, and may be spaced circumferentially around the machine. In the illustrated example, hub 3310 is cutback with scallop 3342 for providing fluid communication to the channels. Although only one scallop 3342 is shown, a plurality of scallops may be located around hub 3310. In other embodiments, other shapes of cutbacks, including a shelf, may be used. As will be appreciated by persons having ordinary skill in the art, the amount hub 3310 may be cutback may be limited by structural considerations, the extent of allowable cutback varying with such parameters as material selection and operating conditions. Channels 3302 may terminate at a variety of locations, including at trailing edge 3336 of blades 3308, or locations downstream, such as downstream of leading edge 3330 of blade 3319. In other embodiments, axial machines may only have channels 3300 or 3302, and the selection may be based on locating channels along the surface having a greater concentration of secondary flow.

Figure 34:
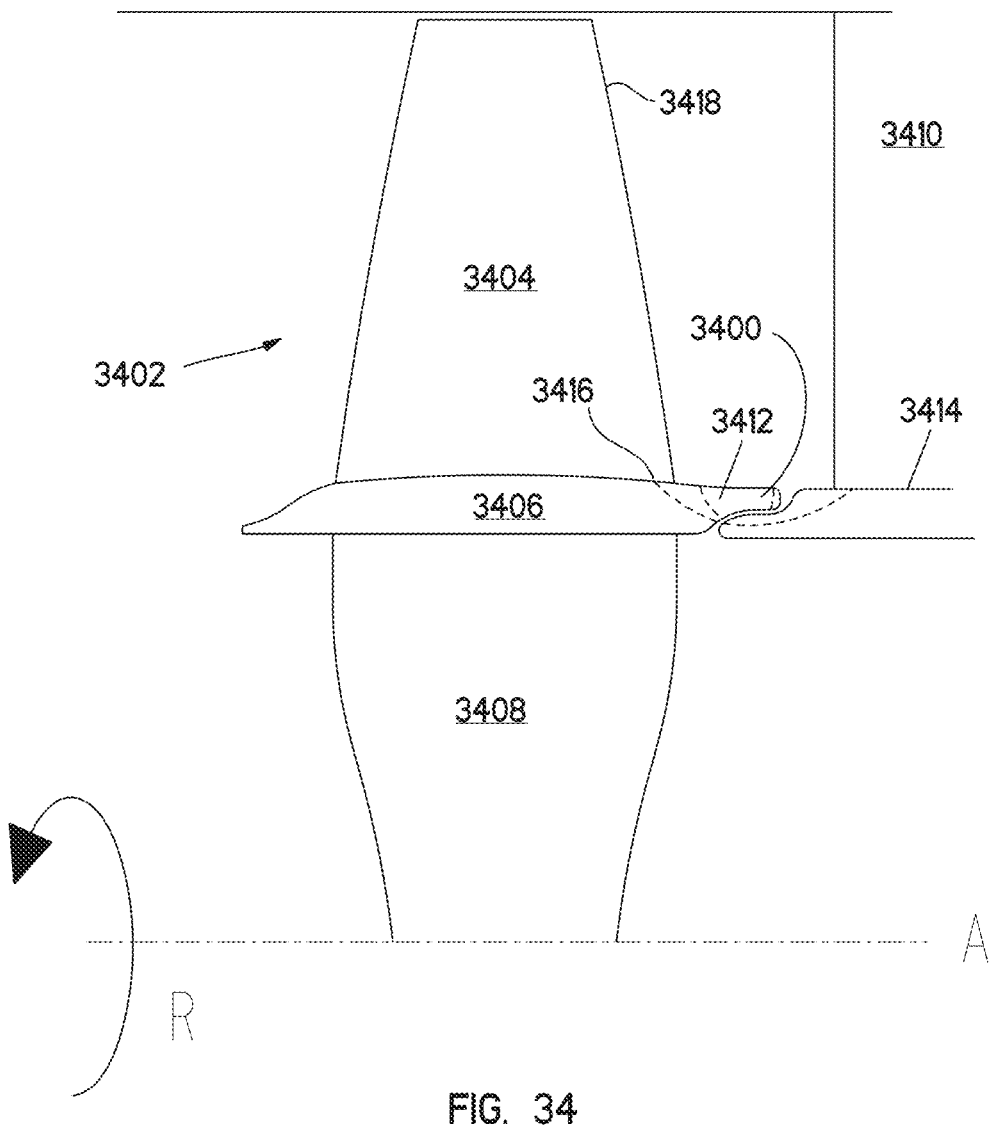
FIG. 34 is a side view of another exemplary axial machine having flow-guiding channels.
Figure 35:
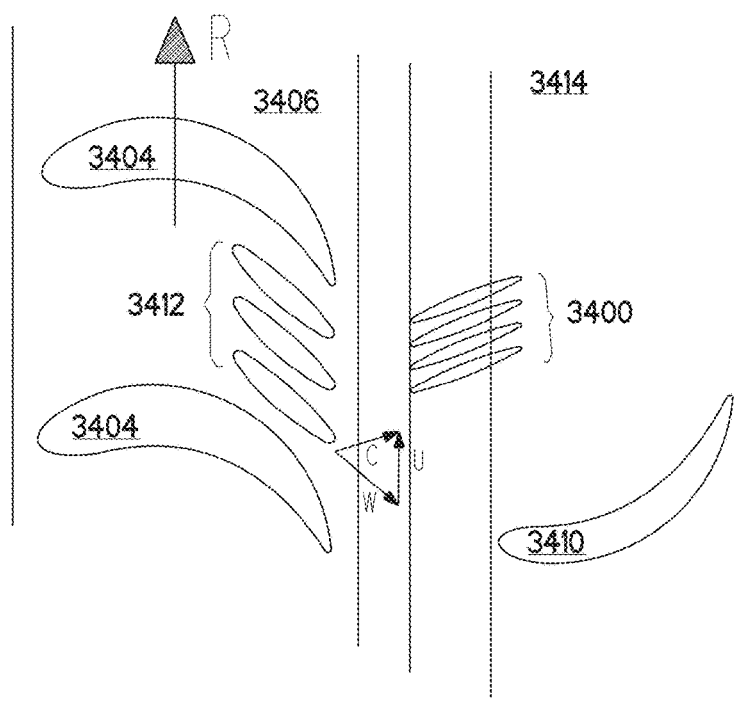
FIG. 35 is a close-up exploded top view of a portion of the machine of FIG. 34.

FIGS. 34 and 35 illustrate another embodiment of hub-side channels 3400 applied to axial machine 3402. As with axial machine 3304, machine 3402 may include impeller blade 3404 fixed to hub 3406 and disk 3408 and located upstream of downstream element 3410, e.g., a stator. Unlike hub 3310, hub 3406 is not cutback. Instead, as best seen in FIG. 35, hub 3406 may include openings 3412 for providing fluid communication to channels 3400 located in back surface 3414 of downstream element 3410. FIG. 35 is a top, exploded view of hub 3406 and back surface 3414, showing openings 3412 in the hub that provide fluid communication between the impeller flow field and channels 3400. As shown in FIG. 34, hub 3406 may overlap back surface 3414, and leading edge 3416 of openings 3412 may be upstream of trailing edge 3418 of blades 3404, thereby allowing flow in the impeller passageway along hub 3406 and upstream of impeller blade trailing edge 3418 to enter and be guided by channels 3400. Thus, the view in FIG. 35 is exploded for illustration purposes and openings 3412 overlap channels 3400. Although only four channels 3400 and three openings 3412 are shown, more of each may be included and may be spaced around the circumference of the machine. As shown in FIG. 35, in the illustrated example, openings 3412 have an elongate shape, and because they are located in the relative frame of reference (on the rotating hub 3406), the openings may be aligned with relative velocity of, for example, the primary flow, $W_P$. By contrast, and as described above, channels 3400 are located in stationary back surface 3414 and, therefore, may be aligned with an absolute velocity, e.g., $C_P$. Such an arrangement as shown in FIGS. 34 and 35 provides an alternative to the embodiment shown in FIG. 33 for guiding hub-side flow in an impeller passageway prior to impeller exit. As will be appreciated, and as discussed more below, similar configurations may be employed with radial machines, and may be employed on the shroud side of shrouded or covered axial or radial machines.

As discussed above, turbomachines typically suffer from meridional velocity and momentum deficits along the hub or shroud surface. For example, radial machines often suffer from a radial momentum deficit along the shroud surface. For compressors, this meridional momentum deficit generated in the impeller can negatively impact the performance of a diffuser downstream of the impeller, including reducing diffuser efficiency and creating flow instabilities. Some existing diffuser designs seek to reduce the negative impact by including a diffuser passage width reduction, or "pinch," at the inlet of the diffuser on the weak, momentum-starved side of the diffuser passage, for example, the shroud-side of the diffuser, to thereby increase meridional velocity and stabilize the flow. In some cases, prior designs include a passage width reduction on both the shroud and hub side of the diffuser, sometimes referred to as balanced pinch, to increase meridional velocity and stability. The present inventor, however, has discovered that instead of a dominate weak-side pinch, or a balanced-pinch, diffuser performance (for both vaned and vaneless diffusers) and overall system performance may be improved the most with a strong-side pinch in the diffuser inlet region. In other words, a dominant passage width reduction on the side of the diffuser passageway with greater meridional momentum and more stability and opposite the side with the meridional velocity deficit. While not being limited to a particular theory, such strong-side curvature may improve diffuser performance by leveraging the stronger-component of the impeller exit flow to impose a healthier pressure distribution on the opposite, weak side of the turbomachine passageway. In addition, it is well known that convex curvature tends to cause flow instability and exacerbate boundary layer growth. Thus, the common approach of including a convex surface in the form of a passage width reduction on the meridional-momentum-starved side may create instabilities in an already unstable flow field.

Figure 36:
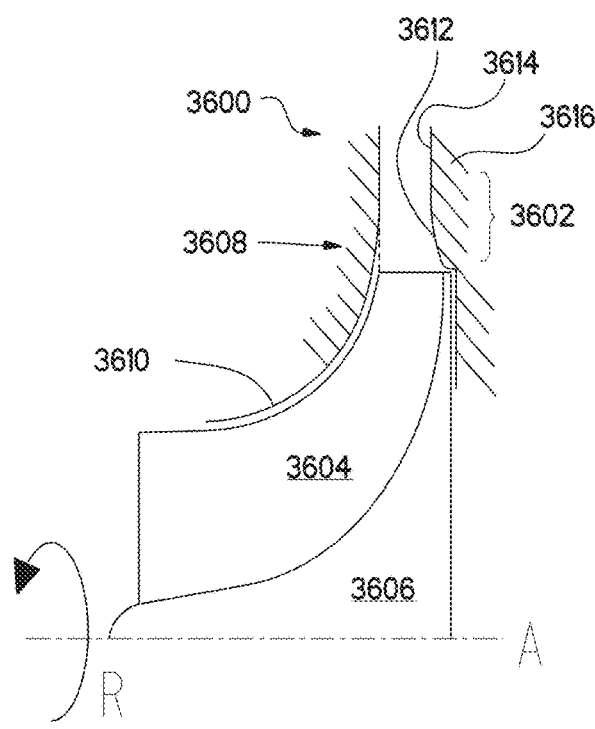
FIG. 36 is a cross-sectional side view of an exemplary diffuser having strong-side curvature.
Figure 37:
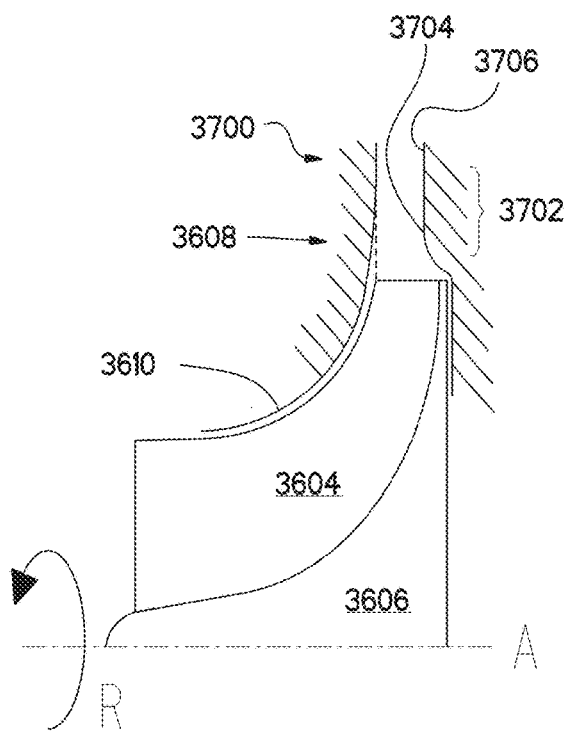
FIG. 37 is a cross-sectional side view of another exemplary diffuser having strong-side curvature.

FIG. 36 illustrates exemplary vaneless diffuser 3600 with strong-side pinch in region 3602. Impeller 3604 may be located upstream of diffuser 3600 and may be fixed to hub 3606 and configured to rotate about axis of rotation A as indicted by arrow R. During operation, impeller 3604 may generate a flow field at impeller exit 3608 that has a concentration of high angle, low meridional momentum secondary flow along shroud surface 3610 that can degrade diffuser performance. As shown, diffuser 3600 may include strong-side curvature 3612 in diffuser rear surface 3614 of diffuser back plate 3616. Thus, curvature 3612 is located on the same side of the diffuser passageway as hub 3606 and opposite the side with meridional-starved flow, here shroud surface 3610, to improve the stability of the impeller exit flow along the shroud surface. Exemplary curvature 3612 begins immediately downstream of an outer radius of hub disk 3606 and includes a gradual curve resulting in passage width reduction. FIG. 37 illustrates exemplary vaneless diffuser 3700 with strong-side pinch in region 3702 having an alternative strong-side curvature 3704 with the inward curvature of rear surface 3706 occurring more gradually downstream of hub disk 3606. Both of illustrated curvatures 3612 and 3704 begin substantially at impeller exit 3608 and end in the first approximately 10% M of the diffuser (with 100% M being the meridional length of impeller 3604). In alternative embodiments, strong-side curvatures may be longer or shorter, and may have starting locations further down the diffuser. For non-limiting example, strong-side curvatures may begin at any location in an inlet region of a diffuser, or may begin at a diffuser location in the range of 0%-10%, 10%-20%, 20%-30%, 30%-40%, 40%-50%, 50%-100%, or 100%-500% M (with 0% M being the diffuser inlet and 100% M being a location downstream of diffuser inlet by a distance equal to 100% of the meridional length of the impeller). In addition, a length of a strong-side curvature may vary, including 1%-10%, 10%-20%, 20%-30%, 30%-40%, 40%-50%, 50%-100%, or 100%-500% M. As will be appreciated, the location and extent of curvature, the amount of passage-width reduction, the type of reduction (for example, linear, or curved) may be varied with application. As will also be appreciated, any of the diffuser curvatures disclosed herein may be applied to either vaned or vaneless diffusers.

Figure 38:
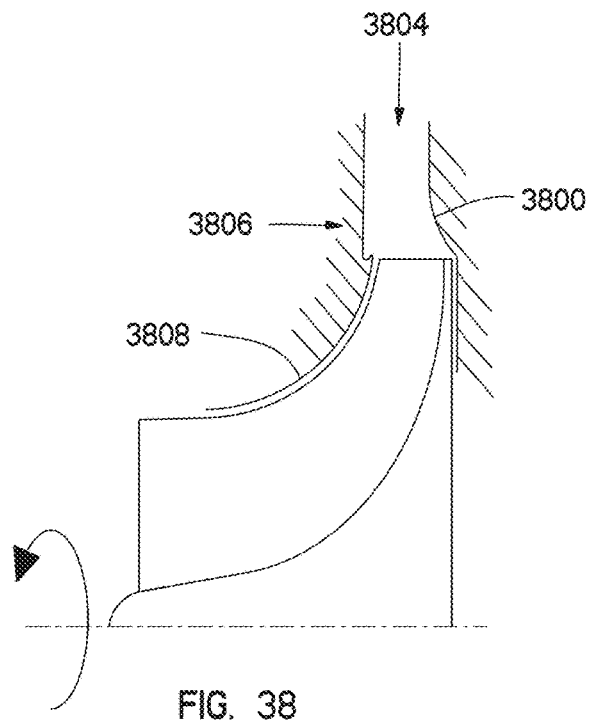
FIG. 38 is a cross-sectional side view of an exemplary diffuser having strong-side curvature and a weak-side treatment.
Figure 39:
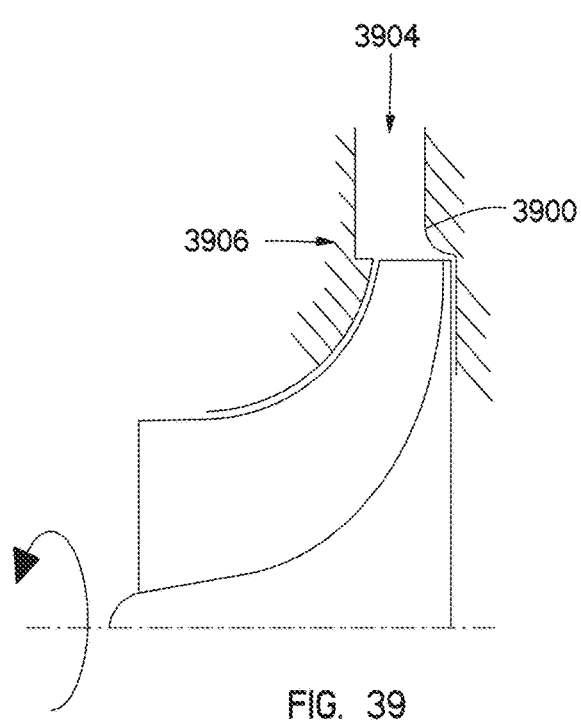
FIG. 39 is a cross-sectional side view of another exemplary diffuser having strong-side curvature and a weak-side treatment.

FIGS. 38 and 39 illustrate additional exemplary strong-side curvatures 3800 and 3900 in diffusers 3804, 3904. FIGS. 38 and 39 also illustrate exemplary weak-side treatments 3806, 3906, that may be combined with any of the strong-side curvatures disclosed herein to improve performance. Exemplary treatment 3806 is an example of concave, or reverse curvature that may be applied to the weak side, here shroud 3808, to improve stability and reduce backflow. As will be appreciated, any of a variety of concave curvatures may be used. Exemplary treatment 3906 (FIG. 39) is an example of an abrupt increase in passage width, for example, a "smoke shelf" which may also improve stability and reduce backflow. Thus, weak-side treatments 3806, 3906 both involve local passage area increases on the radial-momentum-starved side of the impeller passageway.

Figure 40:
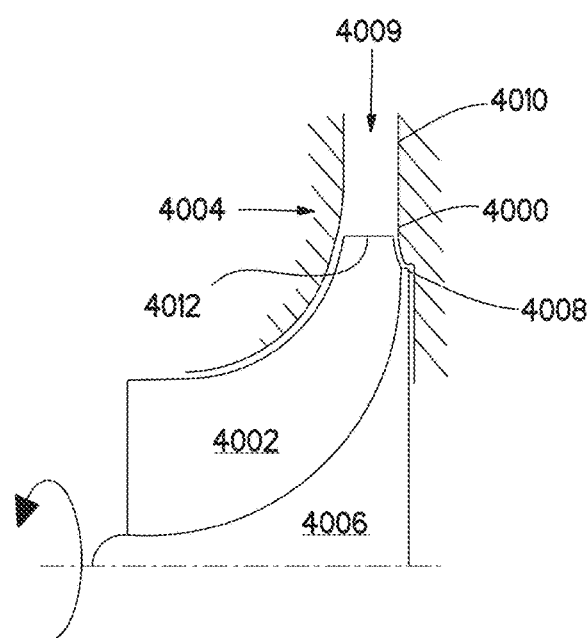
FIG. 40 is a cross-sectional side view of another exemplary diffuser having strong-side curvature.
Figure 41:
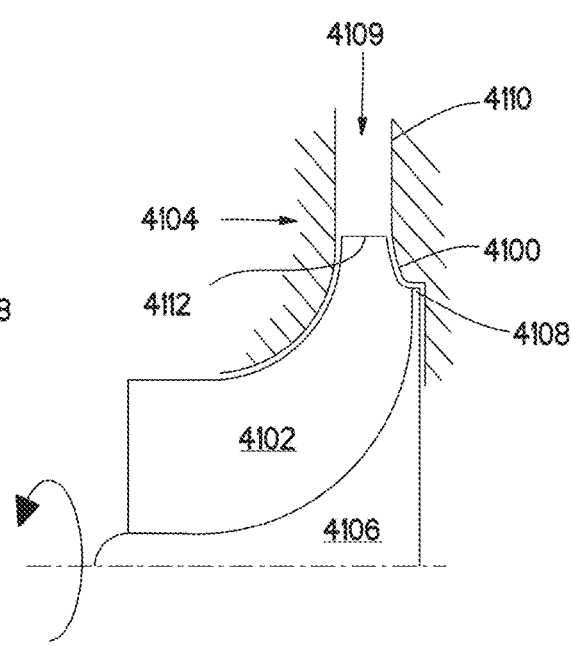
FIG. 41 is a cross-sectional side view of another exemplary diffuser having strong-side curvature.

FIGS. 40 and 41 illustrate embodiments of strong-side curvatures 4000, 4100, beginning in impeller 4002, 4102, upstream of impeller exit 4004, 4104. As shown, hub disks 4006, 4106 may have a reduction in maximum outer diameter such that the hub outer radial extents 4008, 4108 may be located upstream of impeller exit 4004, 4104, such that strong-side curvatures 4000, 4100 may begin prior to the inlet of diffuser 4009, 4109. Thus, a portion of back surfaces 4010, 4110 may define a portion of the impeller passageway upstream of impeller trailing edges 4012, 4112 and may extend inward in a spanwise direction from hubs 4006, 4106, with a convex curvature, thereby beginning strong-side curvatures 4000, 4100 upstream of the trailing edges. FIGS. 40 and 41 illustrate two exemplary curvatures, with strong-side curvature 4100 being greater than curvature 4000 and resulting in a greater passage width reduction. As will be appreciated, any of a variety of curvatures and width reductions may be selected, depending, for example, on application and design intent.

FIG. 42 illustrates another example of strong-side curvature 4200 extending across both hub 4202 and diffuser back surface 4204. As shown, downstream portion 4206, of hub 4202, which may be an exit portion of the hub, may include an inward curvature, thereby beginning strong-side curvature 4200 downstream of impeller trailing edge 4208. Thus, as shown in FIGS. 40-42 hub-side curvatures may be located upstream of an impeller trailing edge via one or both of cutting back the hub disk, or by adding an inward curvature to the hub surface.

In some embodiments, rather than strong-side curvatures 4000, 4100, or in addition to them, flow guiding channels may be located in substantially the same location as strong-side curvatures 4000 and 4100. For example, hub-side channels may be added in a similar fashion to hub-side channels 3302 (FIG. 33B) of axial machine 3304 by cutting back hub disks 4006, 4106 and adding channels to the hub side of diffusers 4009, 4109 at locations upstream of impeller exits 4004, 4104. In yet other examples, hub-side channels, or shroud-side channels in shrouded impellers, may be added to radial machines with an arrangement similar to openings 3412 and channels 3400 of axial machine 3402 (FIG. 34), where openings may be added to the hub or shroud side that provide fluid communication between an impeller passageway and underlying channels.

FIGS. 43 and 44 illustrate an example of strong-side dual curvature 4300 which may include a negative, concave curvature 4302 upstream of a positive, convex curvature 4304. Such a dual-curvature may provide increased flexibility for diffuser design. For example, negative concave curvature 4302 may ease the transition to strong-side convex curvature 4304 and increase the stability of flow along the curved surfaces. As will be appreciated, a location and length, as well as relative lengths of curvatures 4302, 4304, may be varied. In some embodiments, as indicated by the dashed lines in FIGS. 43 and 44, a position of diffuser back surface 4306 may be adjustable such that the extent of curvature and the relative amount of negative and positive curvature may be adjusted to enable variable pinch capability. In the illustrated example, diffuser 4308 may also include some passage width reduction 4310 along shroud 4312, however, such shroud-side pinch is less than the width reduction from strong-side curvature 4300 such that overall, illustrated diffuser 4308 has a strong-side dominated pinch. As discussed above, in other embodiments, a front surface of a diffuser extending downstream of a shroud may not have any pinch, for example, may be substantially flat, or may have some amount of reverse curvature, such as those illustrated in FIGS. 38 and 39.

Figure 45:
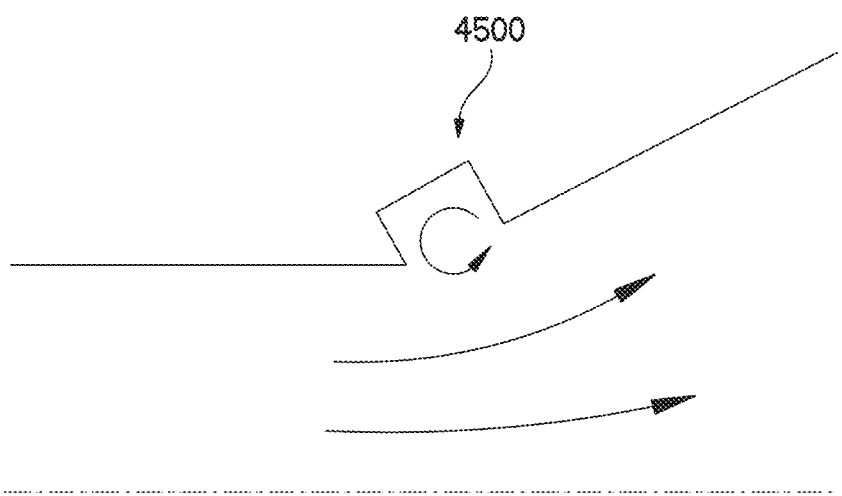
FIG. 45 is a side view of an exemplary trapped corner stall cell.
Figure 46:
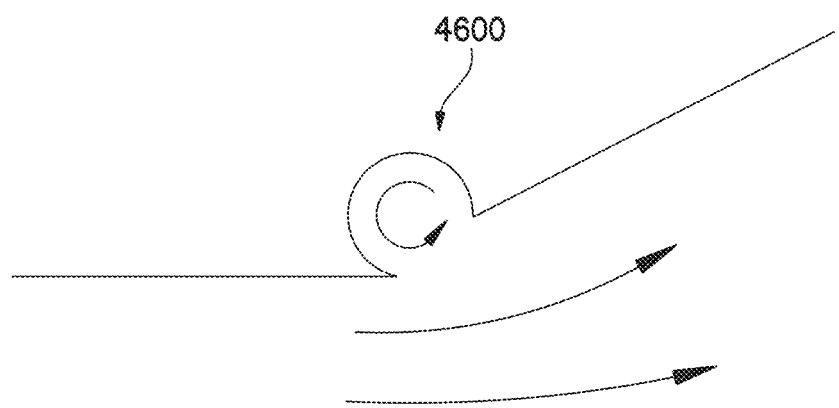
FIG. 46 is a side view of another exemplary trapped corner stall cell.

FIGS. 45 and 46 illustrate exemplary trapped corner stall cells 4500, 4600 that may be utilized in embodiments of the present disclosure to further improve diffuser stability and efficiency. As shown, stall cell 4500 may include a square or rectangular recess and stall cell 4600 may include a substantially circular cross-sectional recess. Such trapped corner stall cells 4500, 4600 may be utilized to improve entry flow control, for example, by being located at a diffuser inlet on a weak-side surface, for example, substantially opposite a location of any one of the strong-side curvatures disclosed herein. For example, one of exemplary trapped corner stall cells 4500, 4600 may be located in exemplary weak-side treatments 3806, 3906 (FIGS. 38, 39).

Figures 47, 48:
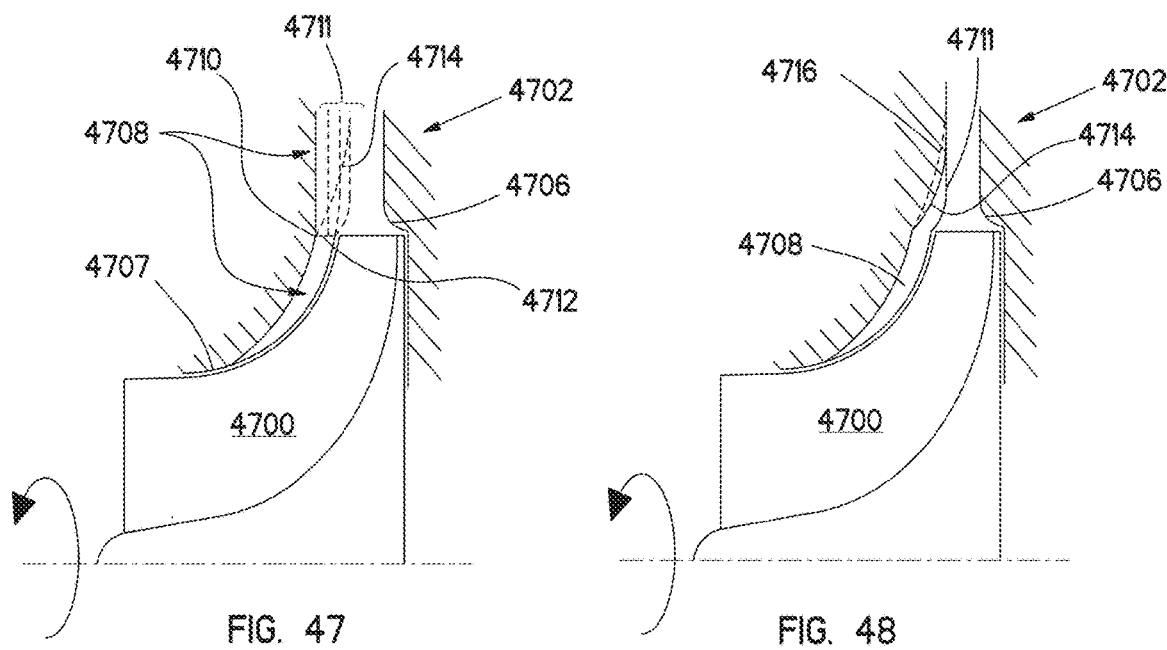
FIG. 47 is a cross-sectional side view of another exemplary diffuser with strong-side curvature showing possible variations of shroud-side contours and flow-guiding channels.
FIG. 48 is a cross-sectional side view of the diffuser of FIG. 47 showing one of the possible shroud-side contours and flow guiding channels.

FIGS. 47-50 illustrate exemplary embodiments of combinations of flow control structures disclosed herein, including the combination of strong-side curvatures and flow guiding channels and ribs, for improving the performance of a turbomachine. FIG. 47 illustrates possible variations of channels 4708, diffuser shroud-side surfaces 4711 and FIGS. 48-50 separately illustrate each of the combinations shown in FIG. 47. FIG. 47 illustrates an exemplary impeller 4700 and diffuser 4702, wherein the diffuser includes passage width reduction from strong-side curvature 4706 which, as described above, may improve diffuser performance. Shroud 4707 may include one or more flow-wise channels 4708, such as any one of the flow guiding channels disclosed herein, spaced circumferentially around the shroud. The three dashed lines 4711 extending substantially vertically from impeller exit 4710 illustrate exemplary diffuser shroud side surfaces, with the solid line at impeller exit showing an alternative exemplary smoke shelf 4712. Angled dashed line 4714 illustrates a possible location of channel 4708 relative to the various diffuser shroud side surfaces 4711, with the dashed lines indicating channel 4708 may abruptly terminate at impeller exit 4710 in the case of smoke shelf 4712, or channel 4708 may extend into diffuser 4702 if a smoke shelf is not employed and a depth of the channel may gradually decrease.

Figures 49, 50:
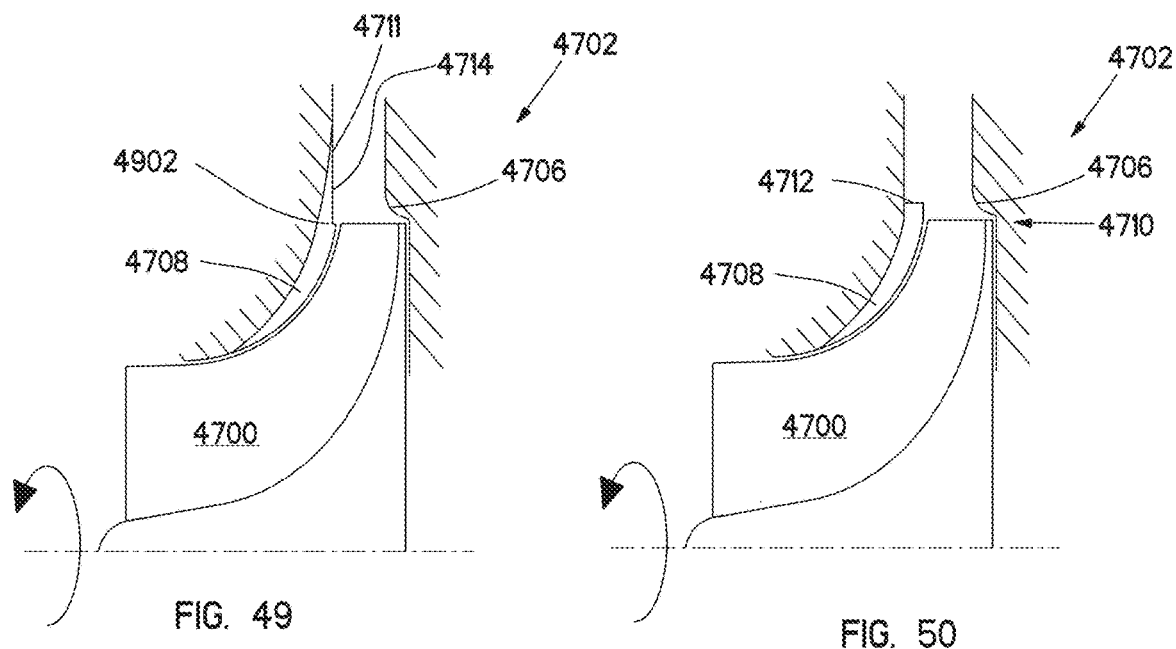
FIG. 49 is a cross-sectional side view of the diffuser of FIG. 47 showing another one of the possible shroud-side contours and flow guiding channels.
FIG. 50 is a cross-sectional side view of the diffuser of FIG. 47 showing another one of the possible shroud-side contours and flow guiding channels.

FIG. 48 illustrates one of exemplary diffuser shroud-side surfaces 4711 having a passage width reduction that, combined with strong-side curvature 4706, results in a dual-side pinch, dominated by the more significant passage width reduction from strong-side curvature 4706. Channel 4708 extends into diffuser 4702 with line 4714 and dashed line 4716 illustrating two possible depth contours for the channel, with both contours having a maximum channel depth adjacent impeller exit 4710 and profile 4716 having a slightly more gradual decreasing depth than 4714. FIGS. 49 and 50 illustrate two possible weak-side treatments in the form of a partial smoke shelf 4902 (FIG. 49) and a full smoke shelf 4712 (FIG. 50). As shown in FIG. 49, one of exemplary diffuser shroud-side surfaces 4711 extends substantially vertically from partial smoke shelf 4902 and channel 4708 extends into and terminates in diffuser 4702.

As shown in FIG. 50, full smoke shelf 4712 in the illustrated example is located downstream of impeller exit 4710 and the beginning of strong-side curvature 4706 and channel 4708 terminates at the full smoke shelf.

Figure 51:
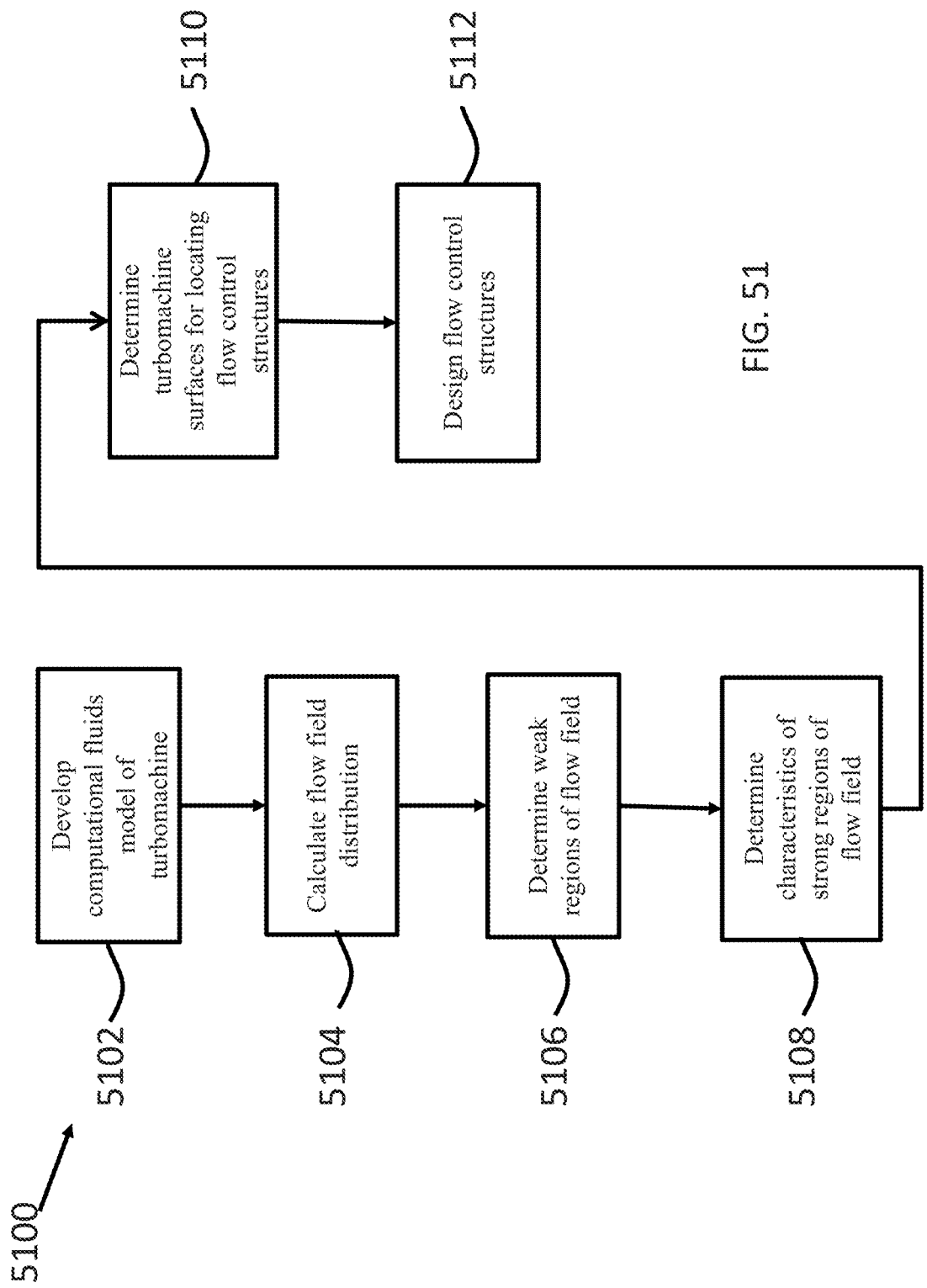
FIG. 51 is a flow diagram illustrating an exemplary process for designing flow control structures for turbomachines.

FIG. 51 illustrates an exemplary process 5100 for designing flow control structures made in accordance with the present disclosure. As shown, exemplary process 5100 may begin at step 5102, and may include developing a computational fluids model of a turbomachine and at step 5104, a flow field distribution, for example, in an impeller passageway may be calculated. In some cases, a flow field distribution may also be determined for a downstream element and such flow field distributions may be calculated for a variety of different operating conditions. As is known in the art, such calculations may be performed in a variety of ways, including both one dimensional, two dimensional, and three dimensional computational modeling techniques using any of a variety of software, including techniques commonly referred to as Computational Fluid Dynamics (CFD) and may include both steady state and transient calculations.

At step 5106, the calculated flow field may be analyzed to identify weak regions of the flow field. As described herein, a weak region of a flow field may be a region dominated by secondary flow, or that may have a weak relative velocity or meridional velocity component, or that may have a high degree of vorticity, or that may have angle distributions that are significantly different than the primary flow angle, up to and including reverse flow. Step 5106 may also include identifying a divergence region where secondary flow begins to develop. At step 5108, the flow field may also be analyzed to determine characteristics of strong regions of the flow field. For example, step 5108 may include identifying flow angles for a primary component of a flow field distribution at various locations in an impeller passageway. At step 5110, after analyzing the calculated flow field distributions, areas of the turbomachine for locating flow control structures disclosed herein may be identified. For example, if a region of weak flow is identified along a shroud surface in an exit region of the impeller passageway and a divergence region is identified where the weak flow region begins to develop, that portion of the shroud, e.g., adjacent and downstream of the divergence region may be selected for locating one or more flow-guiding channels made in accordance with the present disclosure. A location on the opposite side of the impeller passageway from the weak flow region may also be selected for adding strong-side curvature made in accordance with the present disclosure. At step 5112, after selecting one or more surfaces or locations for adding flow control structures, such flow control structures, such as flow guiding channels and ribs and strong-side dominated curvature may be designed and implemented in the turbomachine.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 52:
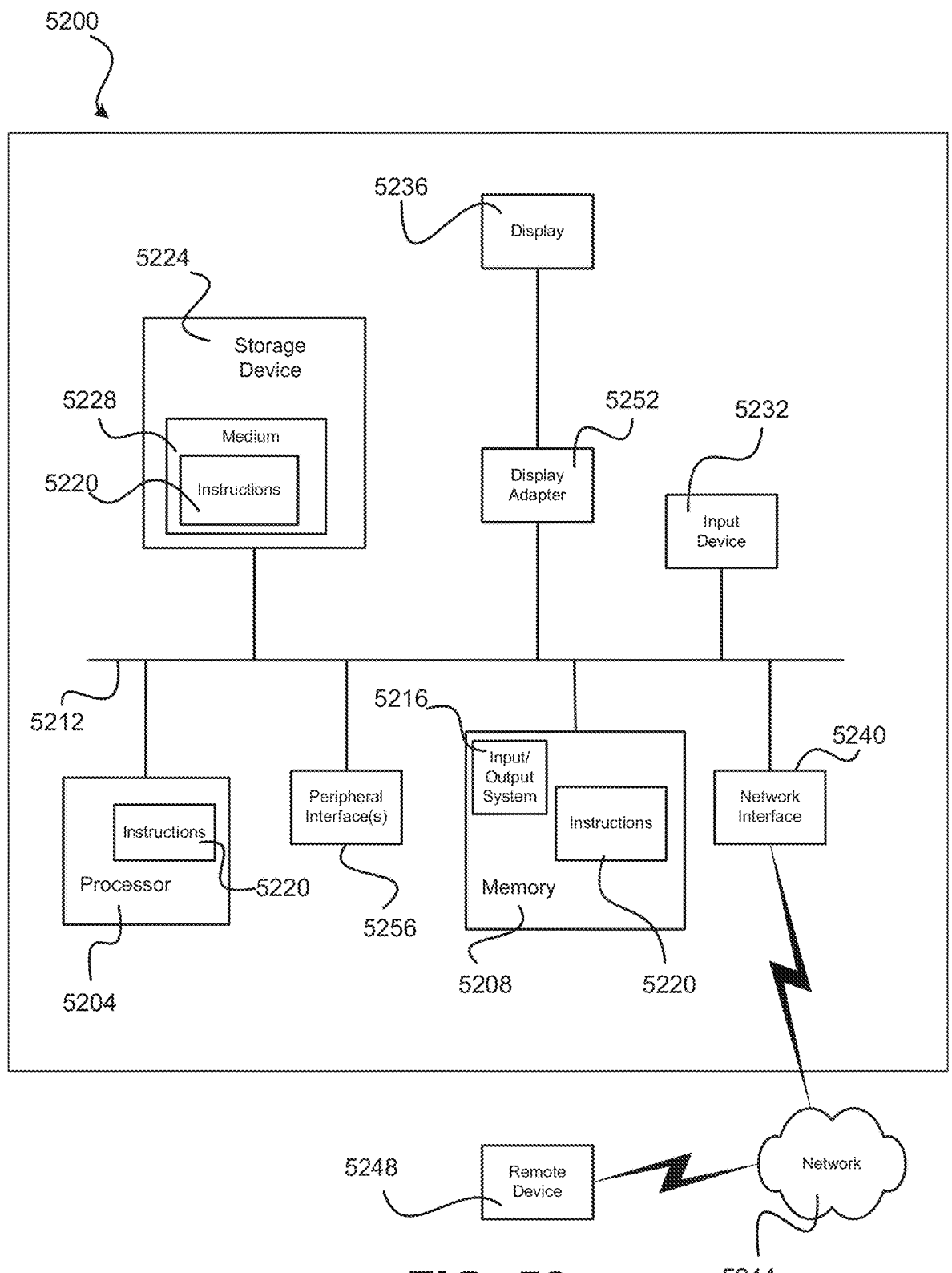
FIG. 52 is a block diagram illustrating a special purpose computing system according to exemplary embodiments of the disclosure.

FIG. 52 shows a diagrammatic representation of one embodiment of a computing device in the exemplary form of a computer system 5200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 5200 includes a processor 5204 and a memory 5208 that communicate with each other, and with other components, via a bus 5212. Bus 5212 may include any of several types of bus structures including, but not limited to, a memory bus, a memory controller, a peripheral bus, a local bus, and any combinations thereof, using any of a variety of bus architectures.

Memory 5208 may include various components (e.g., machine-readable media) including, but not limited to, a random access memory component, a read only component, and any combinations thereof. In one example, a basic input/output system 5216 (BIOS), including basic routines that help to transfer information between elements within computer system 5200, such as during start-up, may be stored in memory 5208. Memory 5208 may also include (e.g., stored on one or more machine-readable media) instructions (e.g., software) 5220 embodying any one or more of the aspects and/or methodologies of the present disclosure. In another example, memory 5208 may further include any number of program modules including, but not limited to, an operating system, one or more application programs, other program modules, program data, and any combinations thereof.

Computer system 5200 may also include a storage device 5224. Examples of a storage device (e.g., storage device 5224) include, but are not limited to, a hard disk drive, a magnetic disk drive, an optical disc drive in combination with an optical medium, a solid-state memory device, and any combinations thereof. Storage device 5224 may be connected to bus 5212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 5224 (or one or more components thereof) may be removably interfaced with computer system 5200 (e.g., via an external port connector (not shown)). Particularly, storage device 5224 and an associated machine-readable medium 5228 may provide nonvolatile and/or volatile storage of machine-readable instructions, data structures, program modules, and/or other data for computer system 5200. In one example, software 5220 may reside, completely or partially, within machine-readable medium 5228. In another example, software 5220 may reside, completely or partially, within processor 5204.

Computer system 5200 may also include an input device 5232. In one example, a user of computer system 5200 may enter commands and/or other information into computer system 5200 via input device 5232. Examples of an input device 5232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 5232 may be interfaced to bus 5212 via any of a variety of interfaces (not shown) including, but not limited to, a serial interface, a parallel interface, a game port, a USB interface, a FIREWIRE interface, a direct interface to bus 5212, and any combinations thereof. Input device 5232 may include a touch screen interface that may be a part of or separate from display 5236, discussed further below. Input device 5232 may be utilized as a user selection device for selecting one or more graphical representations in a graphical interface as described above.

A user may also input commands and/or other information to computer system 5200 via storage device 5224 (e.g., a removable disk drive, a flash drive, etc.) and/or network interface device 5240. A network interface device, such as network interface device 5240, may be utilized for connecting computer system 5200 to one or more of a variety of networks, such as network 5244, and one or more remote devices 5248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 5244, may employ a wired and/or a wireless mode of communication. In general, any network topology may be used. Information (e.g., data, software 5220, etc.) may be communicated to and/or from computer system 5200 via network interface device 5240.

Computer system 5200 may further include a video display adapter 5252 for communicating a displayable image to a display device, such as display device 5236. Examples of a display device include, but are not limited to, a liquid crystal display (LCD), a cathode ray tube (CRT), a plasma display, a light emitting diode (LED) display, and any combinations thereof. Display adapter 5252 and display device 5236 may be utilized in combination with processor 5204 to provide graphical representations of aspects of the present disclosure. In addition to a display device, computer system 5200 may include one or more other peripheral output devices including, but not limited to, an audio speaker, a printer, and any combinations thereof. Such peripheral output devices may be connected to bus 5212 via a peripheral interface 5256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Further alternative exemplary embodiments of the present disclosure are described in the paragraphs below.

In one example, a turbomachine, comprising: a downstream element having an inlet, a shroud side, and a hub side; an impeller comprising a plurality of blades and having an inlet, an exit, and an axis of rotation, each of the plurality of blades having a leading edge and a trailing edge and extending in a spanwise direction from the hub to a shroud side of the blades, the impeller designed and configured to: discharge a working fluid into the downstream element; and generate a flow field in the working fluid, the flow field at the exit including a weak side proximate the shroud side of the blades and a strong side proximate the hub, wherein a meridional component of an absolute velocity of the flow field is greater on the strong side than the weak side; a shroud having a face confronting the shroud side of the plurality of blades; and at least one channel extending in a flow-wise direction along a portion of the shroud and a portion of the shroud side of the downstream element, the at least one channel being designed and configured to increase the meridional component of the weak side absolute velocity. Such an exemplary turbomachine may also include one or more of the following features:

At least one channel is designed and configured to guide a portion of the weak side of the flow field into the downstream element in the flow-wise direction.

Further alternative exemplary embodiments of the present disclosure are described in the paragraphs below:

In one example, a radial turbomachine, comprising: a diffuser having an inlet, a shroud side, and a hub side; an impeller comprising a hub and a plurality of blades and having an inlet, an exit, and, an axis of rotation, each of the plurality of blades having a leading edge proximate the impeller inlet and a trailing edge proximate the exit and extending in a spanwise direction from the hub to a shroud side of the blades, the impeller designed and configured to: discharge a working fluid into the diffuser; and generate a flow field in the working fluid, the flow field at the exit including a weak side proximate the shroud side of the blades and a strong side proximate the hub, wherein a meridional component of an absolute velocity of the flow field is greater on the strong side than the weak side; a shroud having a face confronting the shroud side of the plurality of blades; and at least one channel extending in a flow-wise direction along the shroud, a portion of the channel being located at the exit, the at least one channel being designed and configured to guide a portion of the weak side of the flow field into the diffuser to thereby improve at least one of a flow angle and a velocity of the portion of the flow field. Such an exemplary radial turbomachine may also include one or more of the following features:

At least one of the trailing edges of the plurality of blades is located at a radius, r2, from the axis of rotation, the at least one channel having a beginning location at a radius, rc, from the axis of rotation, and wherein rc/r2 is less than about 1.

Further alternative exemplary embodiments of the present disclosure are described in the paragraphs below.

A method of designing a flow control structure for a turbomachine for two-phase flow, the turbomachine including an impeller having a plurality of blades each having a leading edge and a trailing edge and each extending in a spanwise direction from a hub to a shroud side of the blade, the impeller defining a main impeller passageway extending in a spanwise direction from the hub to the shroud side of the blades, the method comprising: developing, using a computer, a computational model of the turbomachine; calculating, with the model, an amount of liquid and vapor to be conveyed by the impeller; designing at least one flow-wise channel for capturing and conveying one of the liquid and the vapor in a flow-wise direction to thereby remove the liquid or vapor from the main impeller passageway.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of creating a flow control structure for a turbomachine having an impeller, a shroud, a hub, and a downstream element, the method comprising:
   identifying, in a flow field distribution of the impeller, a weak region with a low meridional component of velocity having a concentration of secondary flow; and
   defining at least one channel located in a surface of the hub or shroud for redirecting at least a portion of the secondary flow into the downstream element, the defining including:
   selecting a location on the hub or shroud surface adjacent the weak region for locating the at least one channel;
   determining a desired flow angle for the secondary flow; and determining a channel angle of the at least one channel, the channel angle designed to redirect the secondary flow towards the desired flow angle.

2. The method of claim 1, wherein the impeller includes leading and trailing edges and defines an impeller passageway that extends in a flow-wise direction between the leading and trailing edges and extends in a spanwise direction between the hub and shroud, wherein the selecting a location includes:
identifying a divergence region in the flow field distribution where an outer spanwise portion of the flow field distribution adjacent the hub or shroud begins to be dominated by secondary flow; and
locating a beginning of the at least one channel adjacent or upstream of the divergence region.

3. The method of claim 2, wherein the identifying a divergence region includes identifying a meridional location where an absolute angle of the outer spanwise portion begins to exceed an absolute flow angle of a remaining spanwise portion of the flow field distribution.

4. The method of claim 2, wherein the outer spanwise portion extends across at least 15% of the impeller passageway in the spanwise direction.

5. The method of claim 1, wherein determining a desired flow angle for the secondary flow includes determining an average absolute flow angle of a primary flow component of the flow field distribution and determining a channel angle includes selecting an angle for the at least one channel that is the same as the average absolute flow angle of the primary flow component.

6. The method of claim 5, wherein determining the average absolute flow angle of the primary flow component includes at least one of performing a computational fluid dynamics calculation or obtaining flow sensor measurements of the turbomachine.

7. The method of claim 5, wherein determining the average absolute flow angle of the primary flow component includes determining an average absolute flow angle of the primary flow component in an exit region of the impeller.

8. The method of claim 1, wherein the defining further includes:
determining a volume of the secondary flow; and
selecting a cross sectional area distribution of the at least one channel to accommodate a first portion of the volume of secondary flow.

9. The method of claim 8, wherein the selecting a cross sectional area distribution includes defining a width and depth of the at least one channel, wherein at least one of the width or depth increases along a flowwise direction of the at least one channel to accommodate an increasing volume of secondary flow.

10. The method of claim 1, wherein the defining further includes selecting an angle of a sidewall of the at least one channel to minimize pressure wave interactions with the impeller.

11. The method of claim 1, wherein the defining further includes locating at least one rib in the at least one channel.

12. A method of defining a flow control structure for a turbomachine having an impeller having an inlet and an exit, a shroud, a hub, and a downstream element, the hub and shroud defining an impeller passageway, the method comprising:
developing, using a computer, a computational fluids model of the turbomachine;
calculating, with the computational fluids model, an impeller passageway flow field distribution;
identifying, in the flow field distribution, a weak region with a low meridional component of velocity having a concentration of secondary flow; and
defining at least one channel that extends in a flow-wise direction in at least one of the hub and the shroud adjacent the weak region that is configured to guide the secondary flow into the downstream element in the flow-wise direction, wherein the defining includes determining a channel angle of the at least one channel, the channel angle designed to redirect the secondary flow towards a desired flow angle.

13. The method according to claim 12, wherein said identifying further includes identifying a divergence region in the flow field distribution where a flow angle of a first portion of the flow distribution diverges from a flow angle of a second portion of the flow field, and said defining includes locating a beginning location of the at least one channel adjacent or upstream of the divergence region.

14. The method according to claim 12, wherein said identifying further includes identifying an angle of a primary flow component at the impeller exit, and said determining a channel angle includes selecting an angle for the channel angle based on the angle of the primary flow component.

15. The method according to claim 14, wherein said defining includes setting the channel angle to be the same as the angle of the primary flow component.

16. The method according to claim 12, wherein said defining includes defining a cross sectional area of the at least one channel to capture both secondary flow and primary flow to thereby energize the flow distribution along at least one of the shroud and the hub at the impeller exit.

17. The method according to claim 16, wherein said defining includes locating a plurality of the at least one channel along both the hub and the shroud to energize the flow distribution along both the hub and the shroud.

18. A non-transitory machine-readable storage medium containing machine-readable instructions configured to cause a processor to perform operations comprising:
identifying, in a flow field distribution of an impeller, a weak region with a low meridional component of velocity having a concentration of secondary flow; and
defining at least one channel located in a surface of a hub or shroud of the impeller for redirecting at least a portion of the secondary flow into a downstream element, the defining including:
selecting a location on the hub or shroud surface adjacent the weak region for locating the at least one channel;
determining a desired flow angle for the secondary flow; and
determining a channel angle of the at least one channel, the channel angle designed to redirect the secondary flow towards the desired flow angle.

19. The non-transitory machine-readable storage medium according to claim 18, wherein the impeller includes leading and trailing edges and defines an impeller passageway that extends in a flowwise direction between the leading and trailing edges and extends in a spanwise direction between the hub and shroud, wherein the selecting a location includes:
identifying a divergence region in the flow field distribution where an outer spanwise portion of the flow field distribution adjacent the hub or shroud begins to be dominated by secondary flow; and
locating a beginning of the at least one channel adjacent or upstream of the divergence region.

20. The non-transitory machine-readable storage medium according to claim 19, wherein the identifying a divergence region includes identifying a meridional location where an absolute angle of the outer spanwise portion begins to exceed an absolute flow angle of a remaining spanwise portion of the flow field distribution.

21. The non-transitory machine-readable storage medium according to claim 19, wherein the outer spanwise portion extends across at least 15% of the impeller passageway in the spanwise direction.

22. The non-transitory machine-readable storage medium according to claim 18, wherein determining a desired flow angle for the secondary flow includes determining an average absolute flow angle of a primary flow component of the flow field distribution and determining a channel angle includes selecting an angle for the at least one channel that is the same as the average absolute flow angle of the primary flow component.

23. The non-transitory machine-readable storage medium according to claim 22, wherein determining the average absolute flow angle of the primary flow component includes at least one of performing a computational fluid dynamics calculation or obtaining flow sensor measurements of a turbomachine.

24. The non-transitory machine-readable storage medium according to claim 22, wherein determining the average absolute flow angle of the primary flow component includes determining an average absolute flow angle of the primary flow component in an exit region of the impeller.

25. The non-transitory machine-readable storage medium according to claim 18, wherein the defining further includes:
determining a volume of the secondary flow; and
selecting a cross sectional area distribution of the at least one channel to accommodate a first portion of the volume of secondary flow.

26. The non-transitory machine-readable storage medium according to claim 25, wherein the selecting a cross sectional area distribution includes defining a width and depth of the at least one channel, wherein at least one of the width or depth increases along a flowwise direction of the at least one channel to accommodate an increasing volume of secondary flow.

27. The non-transitory machine-readable storage medium according to claim 18, wherein the defining further includes selecting an angle of a sidewall of the at least one channel to minimize pressure wave interactions with the impeller.

28. The non-transitory machine-readable storage medium according to claim 18, wherein the defining further includes locating at least one rib in the at least one channel.

29. The method according to claim 12, wherein the defining further includes selecting a maximum depth of the at least one channel within the impeller, the maximum depth being less than 30% of a spanwise distance extending between the hub and shroud at the impeller exit.

30. The method according to claim 12, wherein the defining further includes selecting a maximum depth of the at least one channel within the impeller, the maximum depth being less than 5% of a spanwise distance extending between the hub and shroud at the impeller exit.

\* \* \* \* \*